United States Patent
Okamura

(10) Patent No.: US 9,036,057 B2
(45) Date of Patent: May 19, 2015

(54) IMAGE PROCESS APPARATUS AND METHOD FOR CONTROLLING THE SAME

(71) Applicant: CANON KABUSHIKI KAISHA, Tokyo (JP)

(72) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/741,020

(22) Filed: Jan. 14, 2013

(65) Prior Publication Data

US 2013/0188076 A1 Jul. 25, 2013

(30) Foreign Application Priority Data

Jan. 16, 2012 (JP) ................................. 2012-006311

(51) Int. Cl.
*H04N 5/262* (2006.01)
*H04N 5/217* (2011.01)
*H04N 9/74* (2006.01)

(52) U.S. Cl.
CPC . *H04N 9/74* (2013.01); *H04N 5/262* (2013.01)

(58) Field of Classification Search
CPC ... H04N 5/272; H04N 2101/00; H04N 5/772; H04N 5/23293; H04N 5/262
USPC ........................................................ 348/239
See application file for complete search history.

(56) References Cited

U.S. PATENT DOCUMENTS

| 6,850,274 B1* | 2/2005 | Silverbrook et al. ......... 348/239 |
| 2012/0057051 A1* | 3/2012 | Ito et al. ....................... 348/239 |

FOREIGN PATENT DOCUMENTS

| JP | 11-18005 A | 5/1989 |
| JP | 2001-346218 A | 12/2001 |

* cited by examiner

*Primary Examiner* — Nhan T Tran
*Assistant Examiner* — Quang Le
(74) *Attorney, Agent, or Firm* — Canon U.S.A., Inc. IP Division

(57) ABSTRACT

An image processing apparatus generates an image by adding a plurality of different film-tone image effects to an input image. When the plurality of different film-tone image effects is added to an input image, if the effects include image slurring or blinking, an addition order is determined so that such effects can be added after the other effects.

13 Claims, 20 Drawing Sheets

FIG. 4

| PROCESS | DEVELOPMENT | EFFECT | REALIZATION MEANS |
|---|---|---|---|
| (1) PHOTOGRAPH (OPTICAL/PHOTOSENSITIVE) | (A) EFFECT OF OPTICAL CHARACTERISTICS<br>(B) EFFECT OF FILM CHARACTERISTICS | (A-1) PERIPHERAL LIGHT AMOUNT DROP<br>(A-1) DISTORTION<br>(B) COLOR STRENGTH, CONTRAST, TONE, DYNAMIC RANGE | (A-1) CORRECTION OF LUMINANCE<br>(A-2) IMAGE DEFORMATION<br>(B) COLOR GRAIN, GAMMA CHARACTERISTICS, CORRECTION OF D RANGE |
| (2) DEVELOP/EDIT | (A) DEVELOPMENT WORK (DEVELOPMENT)<br>(B) DEVELOPING TIME, METHOD (DEVELOPMENT) | (A) SCRATCH NOISE<br>(B) GRAIN-LIKE NOISE, LEFT SILVER, COLOR REPRODUCTION | (A) ADDITION OF SCRATCH NOISE<br>(B) ADDITION OF GRAIN NOISE (SYNTHESIS) |
| (3) STORE | (A) FILM ALTERATION DUE TO SECULAR CHANGE | (A-1) COLOR FADING<br>(A-2) COLOR CHANGING | (A) CORRECTION OF SATURATION<br>(B) CORRECTION OF COLOR BALANCE |
| (4) PLAY | (A) UNEVEN ROTATION OF FILM REEL<br>(B) UNEVEN BRIGHTNESS OF LIGHT SOURCE OF PROJECTOR | (A) VERTICAL MOTION<br>(B) BLINKING | (A) MEMORY CLIPPING POSITION CORRECTION<br>(B) AMPLITUDE MODULATION OF LUMINANCE |

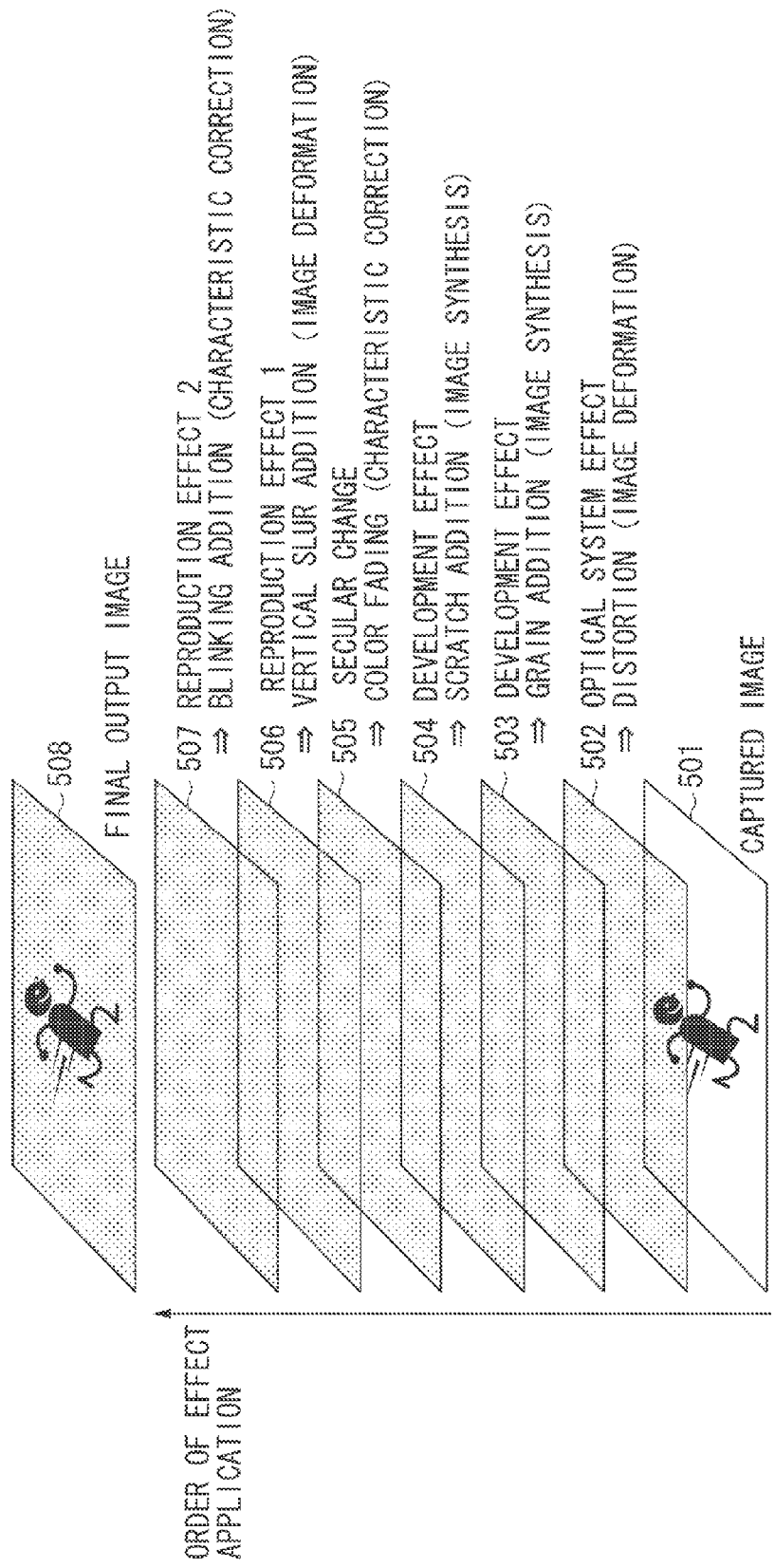

FIG. 6

| EFFECT | MEANS | ATTRIBUTE | PRIORITY |
|---|---|---|---|
| DISTORTION | DEFORMATION | OPTICAL SYSTEM | 6 |
| GRAIN NOISE | SYNTHESIS | DEVELOPMENT | 5 |
| COLOR FADING | CHARACTERISTIC CORRECTION | SECULAR CHANGE INTERNAL | 4 |
| SCRATCH NOISE | SYNTHESIS | WORK AFTER DEVELOPMENT | 3 |
| VERTICAL SLURRING | DEFORMATION | REPRODUCTION/ TRANSMISSION | 2 |
| BLINKING | CHARACTERISTIC CORRECTION | REPRODUCTION/ PROJECTION | 1 |

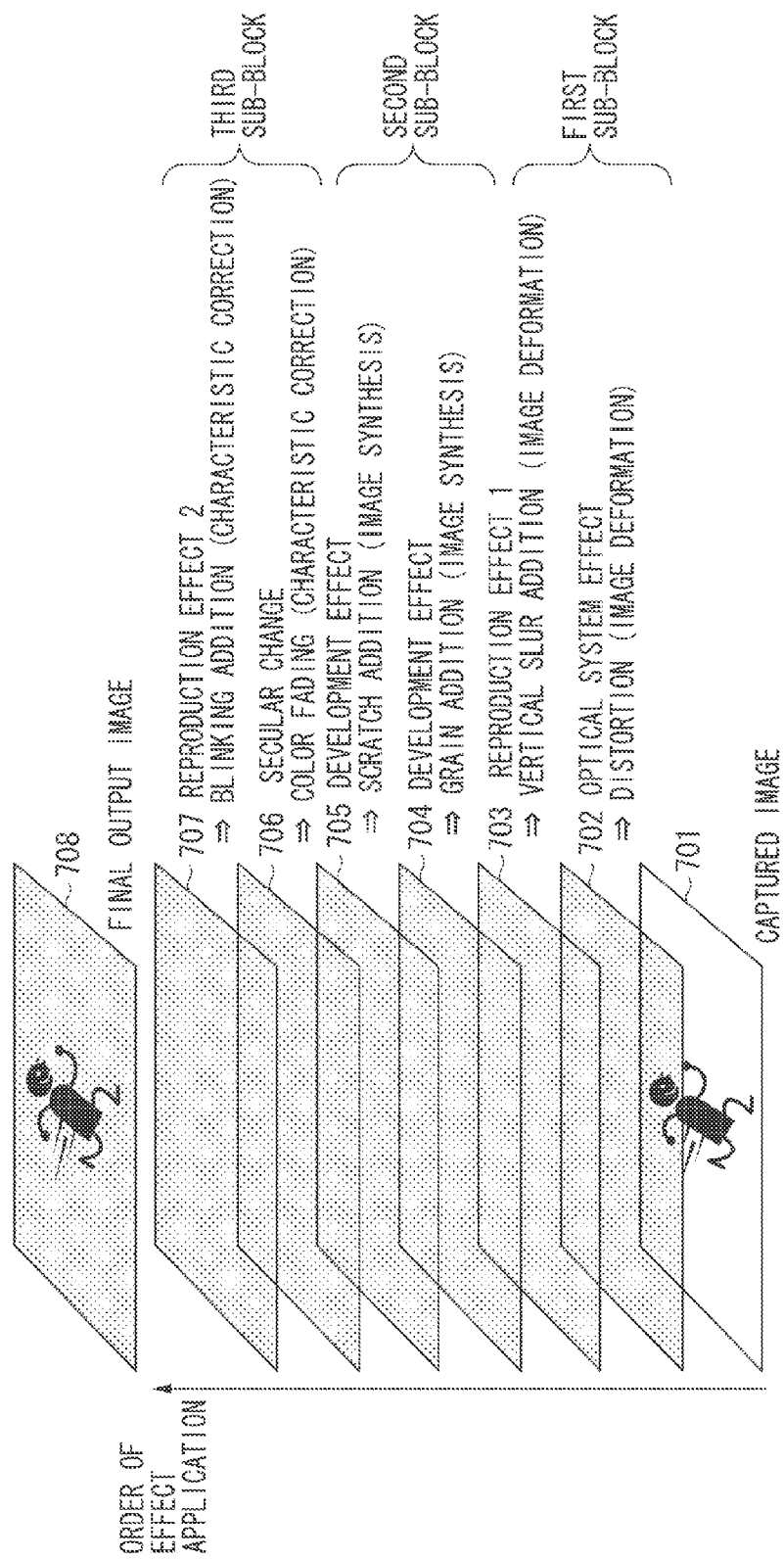

FIG. 8A

EXECUTION ORDER OF SUB-BLOCKS: FIRST ⇒ THIRD ⇒ SECOND

| EFFECT | | MEANS | SUB-BLOCK | ATTRIBUTE | | PRIORITY | | EVALUATION VALUE |
|---|---|---|---|---|---|---|---|---|
| FIRST | SECOND | | | FIRST | SECOND | FIRST | SECOND | |
| CURVING | VERTICAL SLURRING | DEFORMATION | FIRST | OPTICAL SYSTEM | REPRODUCTION | 4 | 1 | 2 |
| COLOR FADING | BLINKING | CHARACTERISTIC CORRECTION | SECOND | INTERNAL | REPRODUCTION | 2 | 1 | 0 |
| GRAIN NOISE | SCRATCH NOISE | SYNTHESIS | THIRD | DEVELOPMENT | WORK AFTER DEVELOPMENT | 3 | 2 | 1 |

FIG. 8B

EXECUTION ORDER OF SUB-BLOCKS: SECOND ⇒ FIRST ⇒ THIRD

| SUB-BLOCK | PRIORITY | | EVALUATION VALUE | | |
|---|---|---|---|---|---|
| | FIRST | SECOND | FIRST | SECOND | TOTOL |
| FIRST | 3 | 1 | 2 | 0 | 2 |
| SECOND | 3 | 2 | 2 | 2 | 4 |
| THIRD | 2 | 1 | 0 | 0 | 0 |

FIG. 8C

EXECUTION ORDER OF SUB-BLOCKS: SECOND ⇒ FIRST ⇒ THIRD

| SUB-BLOCK | PRIORITY | | EVALUATION VALUE | | |
|---|---|---|---|---|---|
| | FIRST | SECOND | FIRST | SECOND | TOTOL |
| FIRST | 4 | 1 | 2 | 0 | 2 |
| SECOND | 4 | | 2 | 2 | 4 |
| THIRD | 2 | 1 | 0 | 0 | 0 |

FIG. 8D

EXECUTION ORDER OF SUB-BLOCKS: SECOND ⇒ THIRD ⇒ FIRST

| SUB-BLOCK | PRIORITY | | EVALUATION VALUE | | |
|---|---|---|---|---|---|
| | FIRST | SECOND | FIRST | SECOND | TOTOL |
| FIRST | 4 | 1 | 2 | 0 | 2 |
| SECOND | 4 | | 2 | 2 | 4 |
| THIRD | 4 | 2 | 2 | 1 | 3 |

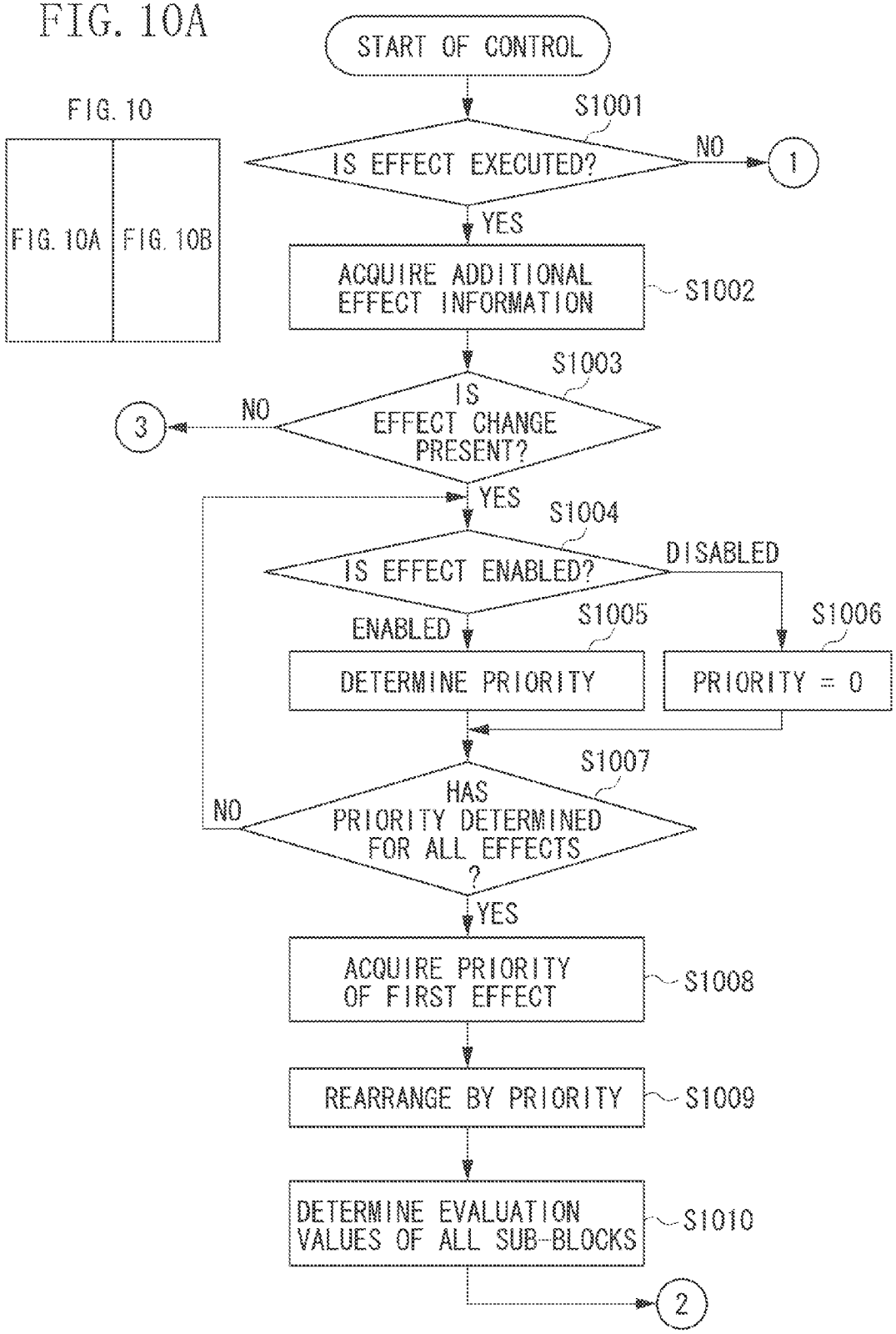

FIG. 13
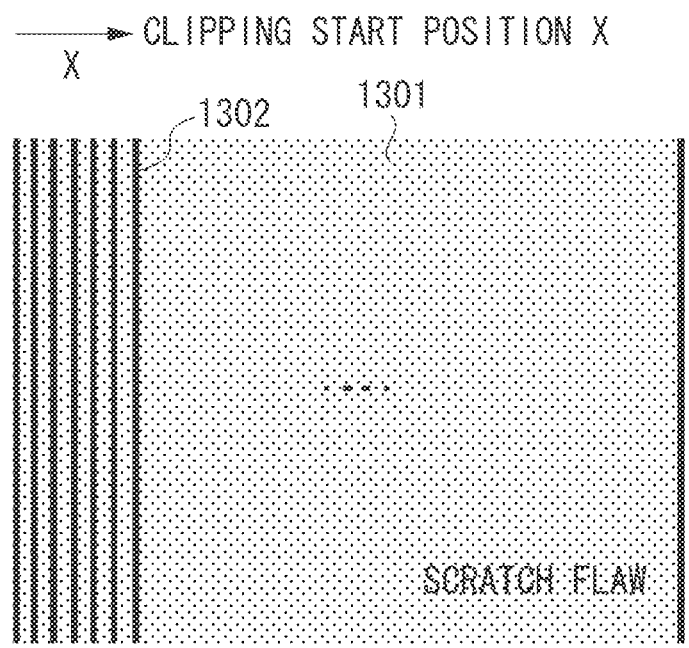
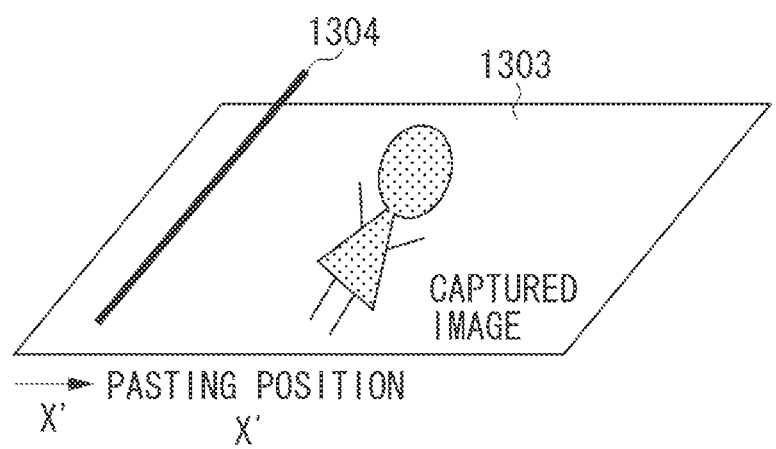

IMAGE PROCESS APPARATUS AND METHOD FOR CONTROLLING THE SAME

BACKGROUND OF THE INVENTION

1. Field of the Invention

The present invention relates to an image processing apparatus that provides a film-tone effect to digital image data, and a method for controlling the same.

2. Description of the Related Art

Recently, there has been a method for carrying out digital photographing with various expressions by adding an effect as if film photographing is executed, to a captured image as one of image expression of a digital camera. Japanese Patent Application Laid-Open No. 2001-346218 discusses a method for carrying out, in order to achieve color reproduction and gradation obtainable by film photographing, predetermined conversion of a digital image to bring it close to a film photography. Japanese Patent Application Laid-Open No. 11-18005 discusses a method for sequentially performing the processes by a user's operation in a case where a plurality of film-tone effects is exerted. However, the order of adding a plurality of film-tone image effects to the image data has only been manually determined by the user's operation.

SUMMARY OF THE INVENTION

The present invention is directed to an image processing apparatus that takes into account an order of adding image effects when processing for adding a plurality of different film-tone image effects is carried out for image data, and, a method for controlling the same.

According to an aspect of the present invention, an image processing apparatus includes: an acquisition unit configured to sequentially acquire image data; a first processing unit configured to carry out image distortion processing on the image data; a second processing unit configured to add noise to the image data processed by the first processing unit; and a third processing unit configured to add slurring to the image data processed by the second processing unit and sequentially output.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a phenomenon and a film-tone effect in the case of the film camera.

FIG. 5 illustrates an order of adding effects according to the first exemplary embodiment.

FIG. 6 illustrates priority of each effect according to the first exemplary embodiment.

FIG. 7 illustrates an order of adding effects according to a second exemplary embodiment.

FIGS. 8A to 8D illustrate priority of each effect according to the second exemplary embodiment.

FIGS. 10A and 10B include a flowchart illustrating processing for determining the order of adding effects according to the second exemplary embodiment.

FIG. 13 illustrates an effect of scratch noise according to the present invention.

DESCRIPTION OF THE EMBODIMENTS

Various exemplary embodiments, features, and aspects of the invention will be described in detail below with reference to the drawings.

In a digital camera, when adding a plurality of types of film-tone image effects to an image, an order of adding the effects must be taken into account. An example where different effects, namely, a grain noise effect for reproducing granular noise generated due to film characteristics or during development and a color reproduction effect for reproducing color fading caused by a secular change of film, will be described.

Figure 3:
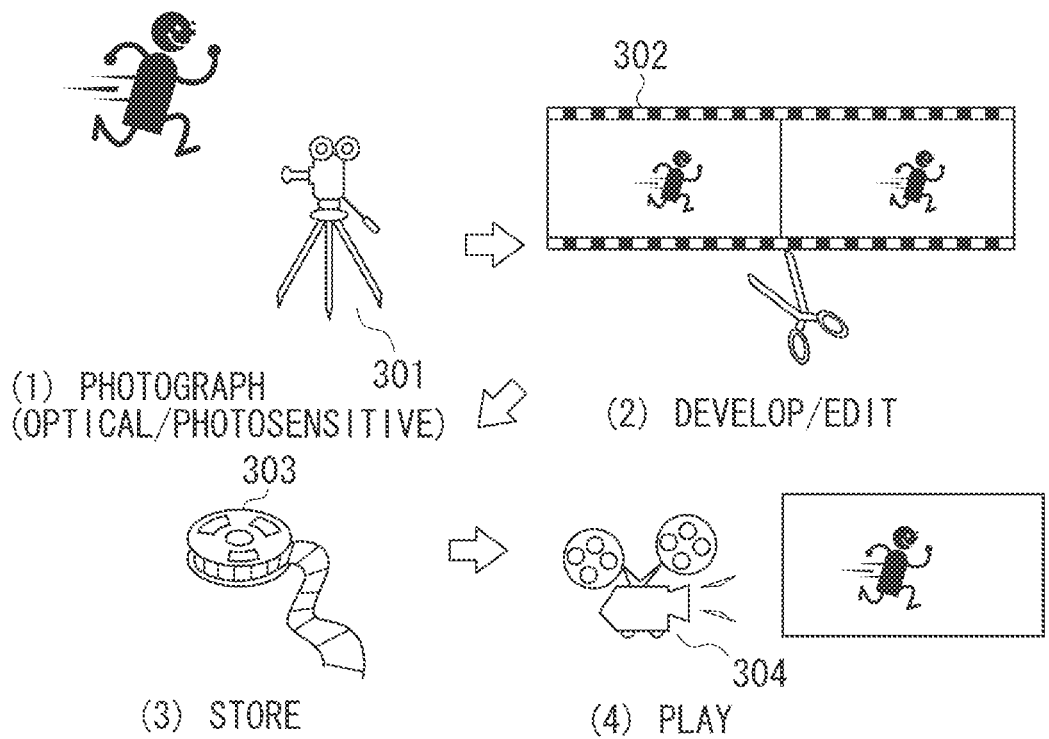
FIG. 3 illustrates a process starting from image capturing to reproduction in the case of a film camera.

FIG. 3 illustrates a process starting from moving image capturing to reproduction in a film camera. FIG. 4 illustrates realization of principal effects caused by a phenomenon occurring during each process illustrated in FIG. 3, by image processing. The process from film photographing to reproduction is divided into four, namely, (1) photographing, (2) development/editing, (3) storage, and (4) reproduction. The film camera passes through the process from the upstream photographing to the downstream reproduction.

In the first process (the photographing), an image is captured on a film by using a film camera 301. In this process, a photosensitive film surface is exposed to incident light, and an image is formed thereon. A difference in optical characteristics of a lens installed in the film camera 301 or chemical characteristics of the film causes a principal phenomenon. An example of an effect caused by such a phenomenon is distortion aberration based on the difference in optical characteristics of the lens.

In the second process (the development/editing), the film image is developed and edited. In this process, a difference in development time or method during film image development or damage of a film surface 302 caused by a development work mistake causes a principal phenomenon. An example of an effect generated by a difference in development method is granular noise. An example of an effect generated by the damage of the film surface 302 is scratch noise.

In the third process (the storage), the developed and edited film 303 is stored. In this process, alteration of the film 303 that has occurred due to deterioration with time caused by a chemical change causes a principal phenomenon. An example of an effect generated by the alteration of the film is color fading.

In the fourth process (the reproduction), the film is set on a projector 304 to show the captured images. In this process, rotational unevenness of a reel on which the film is wound or fluctuation in brightness of a light source of the projector 304 causes a principal phenomenon. An example of an effect generated by the rotational unevenness of the reel is vertical slurring. An example of an effect generated by brightness unevenness of the light source is blinking.

Thus, the phenomena of granular noise and color fading occur in this order in the film photographing. It is therefore desirable to add, when adding a plurality of film-tone image effects, the image effects in the same order as that of the phenomena appearing during the film photographing.

Thus, according to the present exemplary embodiment, when carrying out processing for adding image effects to acquired image data, the image effects are added in the same order as that of the phenomena appearing during the film photographing.

Figure 1:
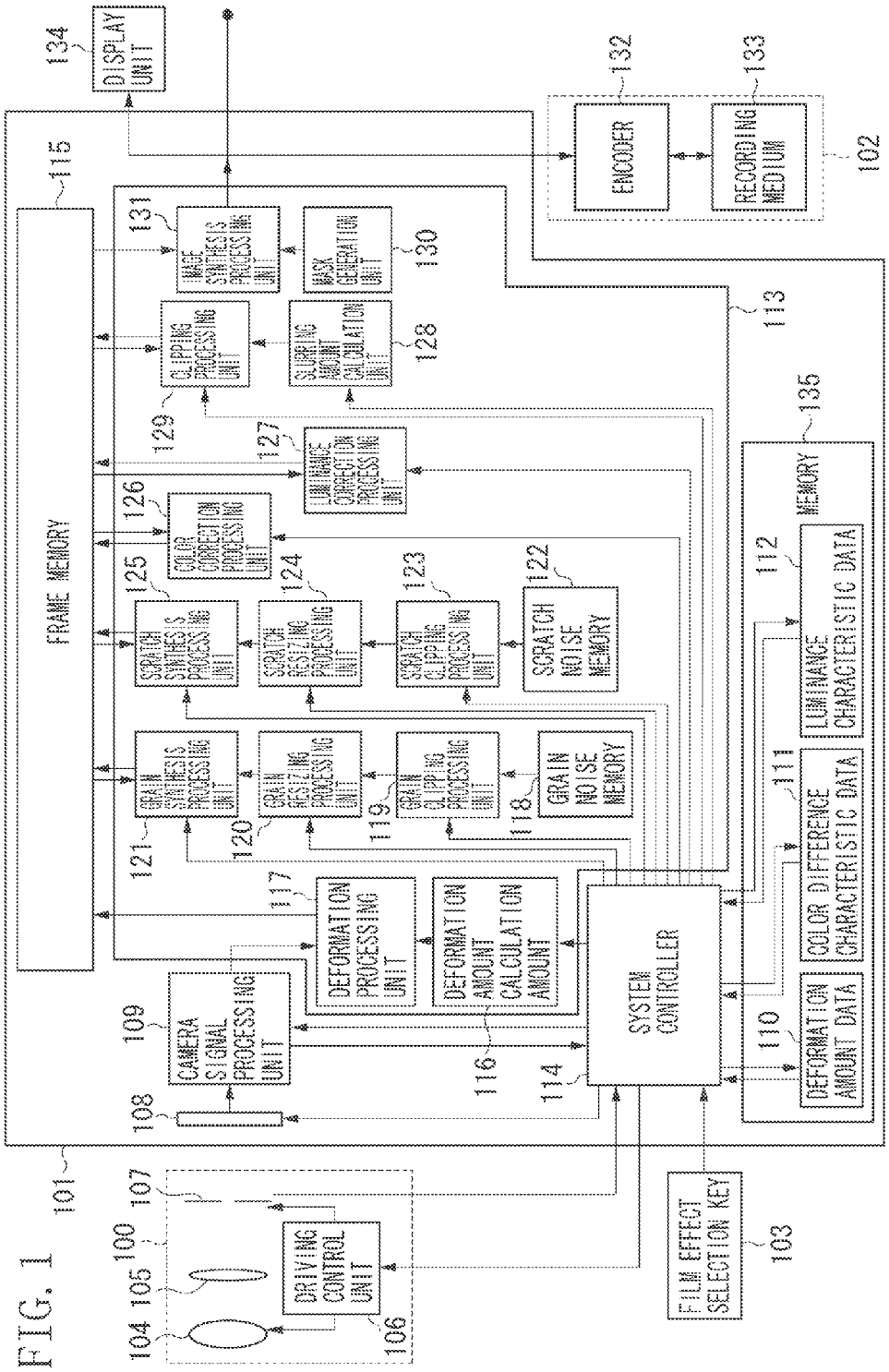
FIG. 1 is a block diagram illustrating an imaging apparatus according to a first exemplary embodiment.

FIG. 1 is a block diagram illustrating a digital video camera as an image processing apparatus according to a first exemplary embodiment. The digital video camera includes: an optical unit 100 that includes a lens, a diaphragm, and an actuator for driving these components; an image capturing unit 101 that processes signals read from an image sensor to sequentially acquire and output image data; a recording unit 102 that records a video signal; and a key switch 103 that includes a group of switches for enabling the user to select and determine film-tone image effects.

A group of lenses 104 and 105 forms an object image. A diaphragm 107 adjusts the amount of incident light. A driving control unit 106 includes an actuator for driving the lens 104 and the diaphragm 107 to have instructed predetermined values. An image sensor 108 photoelectrically converts incident light which passes through the optical unit 100 to form an image. The photoelectrically converted signal is input to a camera signal processing unit 109.

The camera signal processing unit 109 carries out various image processes for the signal photoelectrically converted into a video signal. An image effect processing unit 113 adds various film-tone image effects to the video signal output from the camera signal processing unit 109. The video signal output from the image effect processing unit 113, on which a predetermined user interface screen (hereinafter, UI screen) is superimposed, is displayed on a display unit 134. An encoder 132 codes the video signal output from the image effect processing unit 113 in a predetermined recording format to write and store it in a recording medium 133.

Next, signal processing carried out by the camera signal processing unit 109 will be described. The signal input to the camera signal processing unit 109 is separated into a luminance component and a color component. Various signal processes such as gamma processing, color matrix processing, and contour enhancement processing are performed on the separated luminance component and the color component. A frame memory 115 stores an image processed by the image effect processing unit 113. The image is written or read at predetermined timing.

The image effect processing unit 113 adds a plurality of different film-tone image effects to the input image. The effects to be added are "distortion" for adding a distortion, "grain noise" for adding granular noise, "scratch noise" for adding vertical noise, "color fading" for reducing saturation, "blinking" for adding fluctuation of a luminance level which changes with time, and "vertical slurring" for adding vertical slurring. The effects added by the image effect processing unit 113 realize by image processing the same effects as those of the phenomena appearing in the process from recording (hereinafter, photographing) to reproduction (hereinafter, reproduction) in moving image photographing using a film as a recording medium.

This provides the effects of pseudo film photographing and reproduction even for a digital image captured by the image sensor according to the present exemplary embodiment. To realize distortion aberration at the image effect processing unit 113, projective transformation processing is carried out for the image. In order to cause the image effect processing unit 113 to realize granular noise generated on the film surface, a grain noise image prepared beforehand is synthesized with the input image.

Similarly, in order to cause the image effect processing unit 113 to realize scratch noise due to damaging of the film surface, a scratch noise image prepared beforehand is synthesized with the input image. In order to realize color fading due to deterioration with time by the image effect processing unit 113, a saturation level of the image is reduced.

Rotational unevenness of the reel appears as, for example, a vertical change of a scene being reproduced. Accordingly, the rotational unevenness can be realized by the image effect processing unit 113 adding a vertical slurring effect to the image. Fluctuation in brightness of the light source can be realized by adding a blinking effect to provide fluctuation of a luminance level which changes with time, to the image.

A system controller 114 controls the image sensor 108, the camera signal processing unit 109, and the image effect processing unit 113. The system controller 114 designates a signal storage period or reading timing to the image sensor 108. The system controller 114 sets, for the camera image processing unit 109, parameters necessary for image quality setting by various signal processes. The system controller 114 acquires evaluation values necessary for exposure control, focus control, and white balance control from the camera image processing unit 109.

The system controller 114 detects control positions of the lens 104 and the diaphragm 107, determines, based on the evaluation values acquired from the camera image processing unit 109, control values so that the control positions can be placed at desired positions, and then designates the control values to the actuator 106. The system controller 114 instructs each image effect processing unit 113 to determine an execution order of effects and execute various setting operations.

Figure 11A:
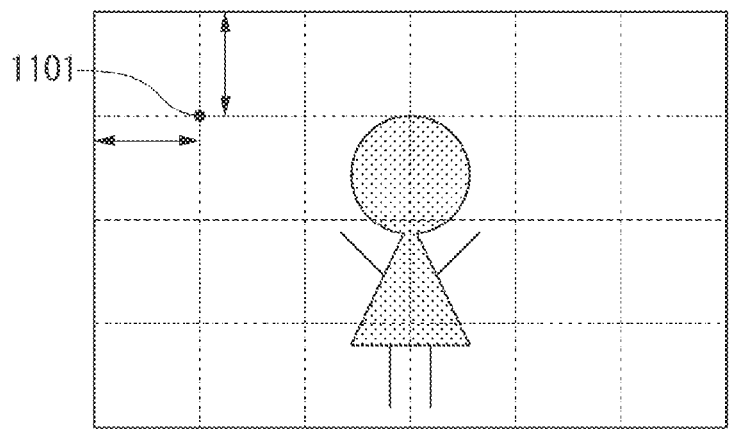
FIGS. 11A to 11C illustrate effects of distortions according to the present invention.
Figure 11B:
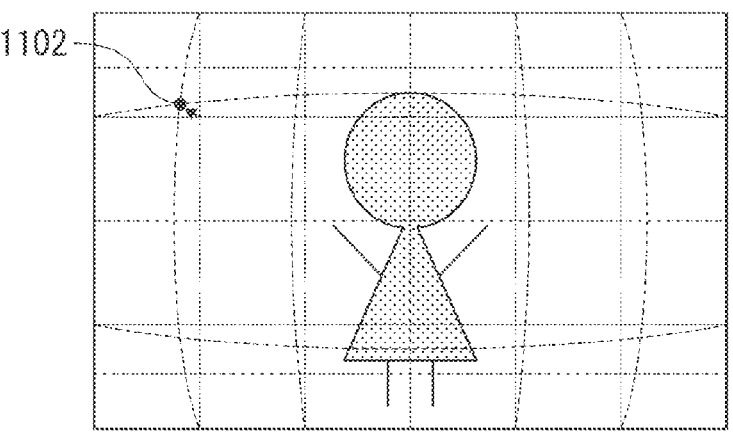
Figure 11C:
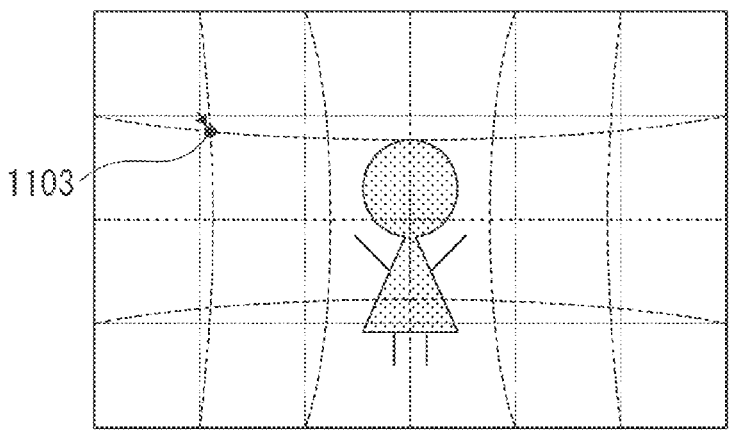

Next, the image processing of adding the film-tone image effects at the image effect processing unit 113 will be described in detail. FIGS. 11A to 11C illustrate projective transformation processing (distortion processing, first processing) for realizing "distortion" according to the present exemplary embodiment.

In the projective transformation processing, the input captured image is divided into a predetermined number of regions, and each intersection point of the divided region is moved to predetermined coordinates, thereby realizing deformation of the input image. A minimum unit of the divided region is one pixel constituting an image, and a minimum unit of coordinate movement is also one pixel. An absolute moving amount of each intersection point is point-symmetrical with respect to an image center, and a concentrically varying distortion effect can be realized.

Distortion aberrations are classified into a barrel type and a bobbin type. These two types of distortion aberrations can be realized by changing movement characteristics of the intersection point. The barrel type can be realized by moving outward a coordinate position of the intersection point from the image center. By an effect of the barrel-type distortion, an intersection point 1101 before deformation illustrated in FIG. 11A moves to an intersection point 1102 after deformation illustrated in FIG. 11B.

On the other hand, the bobbin-type distortion can be realized by deformation toward the image center. By an effect of the bobbin-type distortion, the intersection point 1101 before the deformation illustrated in FIG. 11A moves to an intersection point 1102 after deformation illustrated in FIG. 11C. A difference in effect between the barrel type and the bobbin type is provided as a type of a distortion effect to the projective transformation processing unit.

A deformation amount calculation unit 116 illustrated in FIG. 1 calculates a deformation amount added to the input image. The deformation amount calculation unit 116 determines a moving amount of an intersection point of each region when the image input from the frame memory 115 is divided into predetermined regions. A deformation processing unit 117 carries out projective transformation processing for the input image according to the deformation amount determined by the deformation amount calculation unit 116.

The deformation amount calculation unit 116 can acquire intersection point moving amounts of a plurality of patterns based on parameters acquired from a plurality of deformation data stored in a memory 135. Thus, an image where different distortion characteristics are added to the same input image can be acquired by selecting a deformation amount data parameter. In other words, an effect similar to an image captured by a lens of optical characteristics of distortion types at various levels or distortions of a barrel type, and a bobbin type can be provided.

Figure 12:
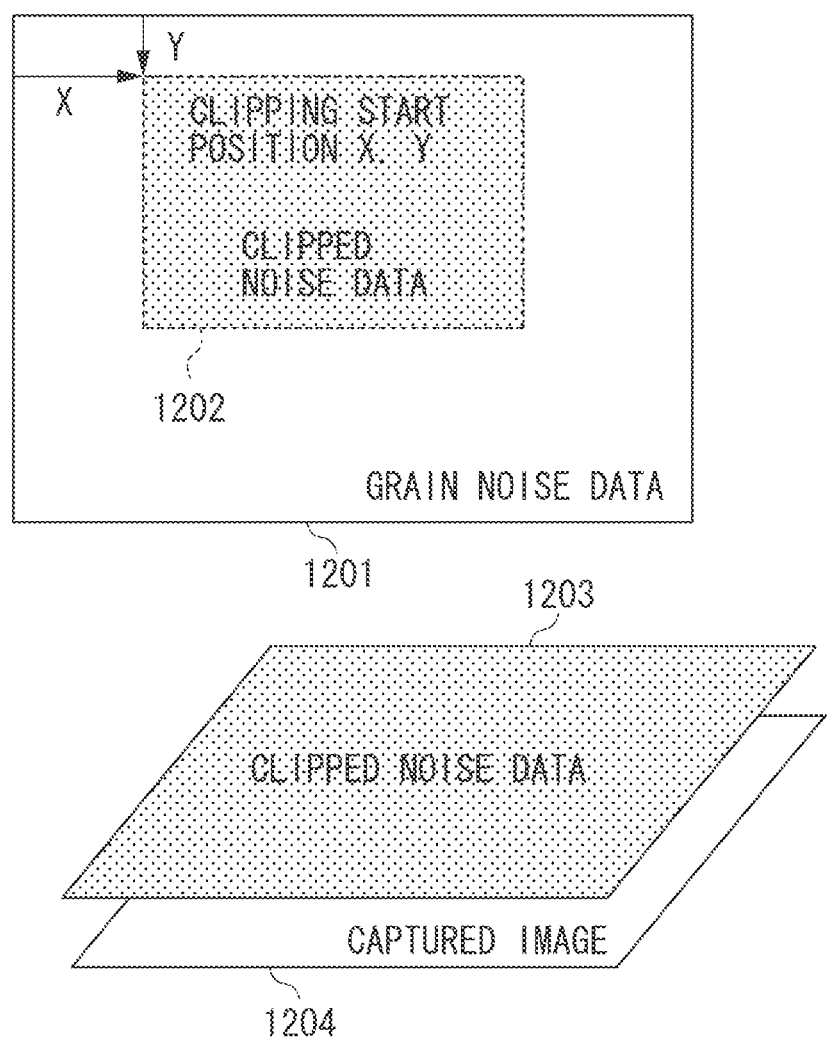
FIG. 12 illustrates an effect of grain noise according to the present invention.

FIG. 12 illustrates a relationship between noise data constituting the grain noise and clipped noise data. A grain noise memory 118 stores two-dimensional noise data 1201 as grain noise. A grain clipping processing unit 119 clips grain noise data 1202 of a predetermined size and data from the grain noise memory 118. A grain resizing processing unit 120 resizes the clipped grain noise data 1202 to grain noise data 1203 of a size required for synthesis with the input image. A grain synthesis processing unit 121 reads a captured image stored in the frame memory 115, and synthesizes the image with the grain noise data 1203 at a predetermined synthesis ratio to store it in the frame memory 115.

FIG. 13 illustrates a relationship between noise data including scratch noise of a plurality of patterns and data clipped therefrom. In scratch noise data 1301, one pixel in a horizontal direction is a minimum unit, a scratch flaw in a vertical direction is stored, and its level is indicated by a random number. A scratch level changes in the vertical direction with a plurality of pixels set as a minimum unit. Accordingly, a depth or a thickness of the scratch noise changes in the vertical direction, and a "blur" of the flaw is represented. Various random numbers such as that of Gaussian distribution can be employed. However, they are not limited to any specific types of random numbers.

In noise synthesis, noise data 1302 is clipped from the scratch noise 1301, and resized to a predetermined image size to generate noise data 1304 to be pasted. Then, depending on a pasting position and pasting duration at that position in the previous pasted noise data 1304, a pasting position of the current noise data 1304 to be pasted is determined to synthesize the data with the captured image.

A scratch noise memory 122 illustrated in FIG. 1 stores the scratch noise data 1301 of the plurality of patterns. The scratch noise data 1301 is read from the scratch noise memory 122. A scratch clipping processing unit 123 clips scratch noise data 1302 at a designated position and of a designated size from the scratch noise data 1301. A scratch resizing processing unit 124 resizes the clipped noise data 1302 to scratch noise data 1304 of a size required for synthesis with the captured image 103 stored in the frame memory 115. A scratch synthesis processing unit 125 reads the captured image stored in the frame memory 115, and synthesizes the image with the resized noise data 1304 at a predetermined synthesis ratio to store it in the frame memory 115.

Figure 14:
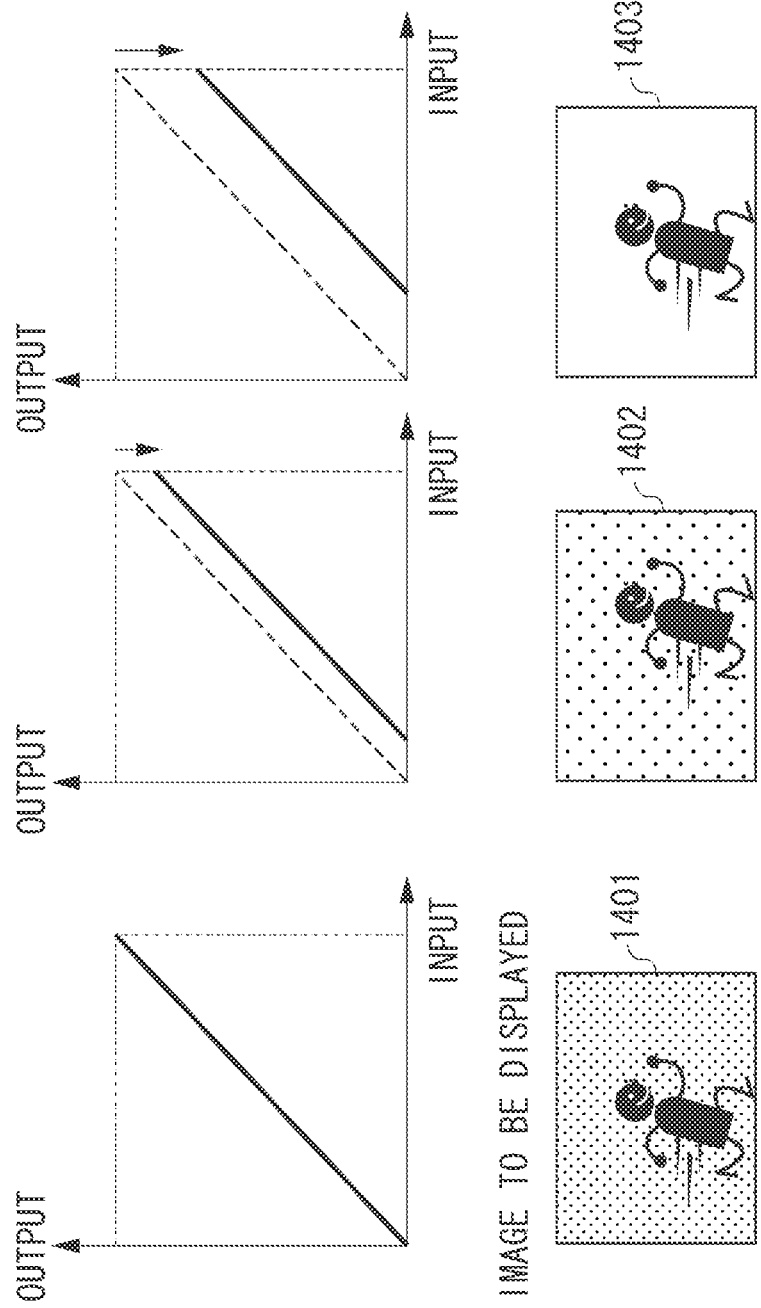
FIG. 14 illustrates an effect of color fading according to the present invention.

FIG. 14 illustrates correction processing of a color difference signal to realize color fading according to the present exemplary embodiment. In the color difference correction processing, saturation of a video signal is reduced by principally changing a color difference component of an output image based on predetermined input/output characteristics for the input captured image, thereby realizing color fading. For example, when the input image is in a YUV format, correction processing is carried out for data of a U signal and a V signal that are color difference components.

Correction processing can also be executed for a Y signal when appropriate. Thus, as a result, only intensity of a color component is changed while maintaining a luminance signal of the image. A minimum unit of a change of the color difference signal is minimum resolution of a signal of the output image.

The memory 135 illustrated in FIG. 1 stores a plurality of color difference characteristic data for determining input/output characteristics of the color difference of the video signal. For example, in the case where characteristics 1401, 1402, and 1403 are represented by a linear function, parameter data includes inclination and intercept of a straight line. The characteristics 1401 indicate normal characteristics showing no color fading. The characteristics 1402 indicate characteristics of color fading, i.e., lighter color, compared with the characteristics 1401. The characteristics 1403 indicate characteristics of much lighter colors than the characteristics 1402.

Characteristic data is determined according to a level of a secular change, for example, the number of years elapsed after film development. The determined parameter data is transmitted to a color difference correction processing unit 126. The color difference correction processing unit 126 corrects the input/output characteristics of the color difference for the captured image read from the frame memory 115 according to the parameter data indicating the determined characteristics, and outputs the corrected captured image to the frame memory 115. Further, as described above, correction processing of, for example, a gain, can be carried out for the luminance signal.

Figure 15:
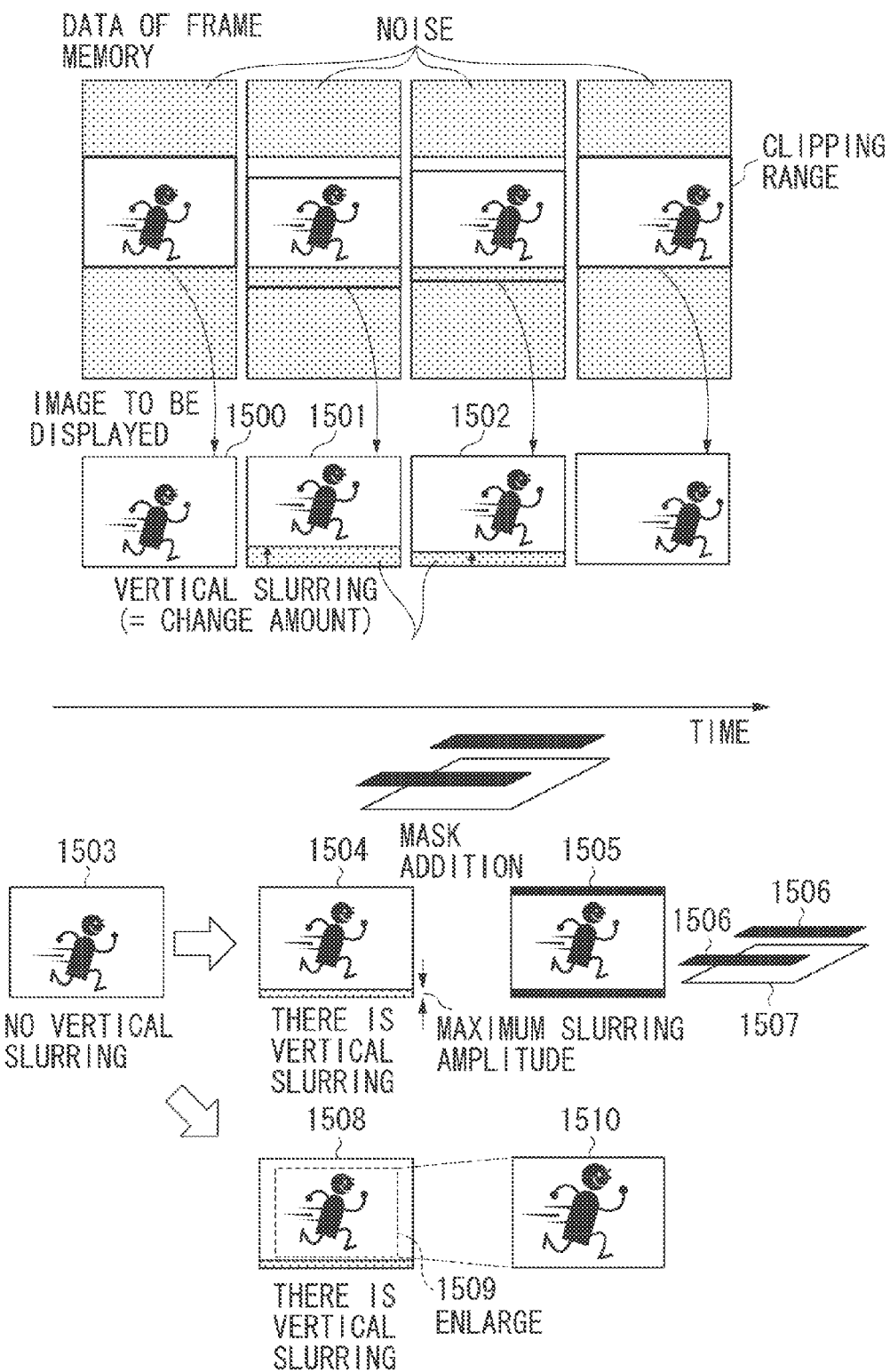
FIG. 15 illustrates an effect of vertical slurring according to the present invention.

FIG. 15 illustrates a data structure in the frame memory 115 that stores the image captured by the image sensor, and an image displayed when the data is clipped at an arbitrary position from the frame memory 115. The data in the frame memory is sequentially updated. Data for a different purpose is stored in a region preceding or following the captured image to be subjected to vertical slurring processing. However, this data can be regarded as noise data since it has no relation to the vertical slurring processing.

When the captured image is selected at a predetermined clipping start position within a predetermined clipping range, the image is output as a display image 1500. At this time, by determining the clipping start position based on a random number, the image can be clipped from a randomly determined position. As a result, the captured image to which an effect of vertical slurring has been added is output as a display image 1501 or 1502.

The clipping start position is determined with one pixel of the image in the vertical direction, namely, one line is set as a minimum unit. Various random numbers such as that of Gaussian distribution can be employed, however, they are not limited to any specific types of random numbers.

Vertical slurring beyond a certain amount is prevented by placing an upper limit on an offset amount (slurring amount) from a reference position to the clipping start position. As for the vertical slurring, a state of no slurring is set as the reference position. A sum of two vertical slurring amounts determined by different cycles is set as the clipping start position. This enables representation of vertical slurring configured of a combination of different types, specifically, vertical slurring generated by a film feeding operation and vertical slurring generated by a film winding operation.

As described above, when the vertical slurring effect is added, the noise data (data where the acquired image data is not present) is displayed below the displayed image, which must be hidden. A hiding method will be described below. As for the captured image 1503 having no vertical slurring, noise data is displayed on a lower part of the screen for the captured images 1504 and 1505 where arbitrary vertical slurring has occurred. As the hiding method, for example, a method for adding a mask or a method for enlarging image data may be used.

In the method for adding the mask, for a captured image 1507, a mask image 1506 where vertical slurring is equal to or larger than maximum slurring width (the offset amount) is superimposed on the lower part of the screen to hide the noise data. At this time, by superimposing a mask image of an equal size in the upper part of the screen, the captured image 1505 having an aspect ratio of a letter box shape can be displayed.

On the other hand, the method for enlarging the clipped image data to an original image size instead of adding a mask can also be employed. In this case, the system controller 114 enlarges the image data such that a height of a region 1509 not including a maximum slurring width of vertical slurring inside a captured image 1508 where vertical slurring occurs, is equal to a screen height. Thus, the system controller 114 displays the image data as displayed image 1510. At this time, an aspect ratio of the screen must be maintained.

A clipping processing unit 129 reads, to provide a vertical slurring effect, the captured image from the frame memory 115 at an arbitrary position designated by a slurring amount calculation unit 128, and stores the captured image in the frame memory 115.

A mask generation unit 130 generates a mask image having a predetermined vertical width. The predetermined vertical width can be set equal to or more than a maximum slurring width added to current image data and acquired from the system controller 114, or a mask image stored beforehand with a sufficient vertical width can be used. A mask synthesis processing unit 131 synthesizes a mask image 1308 generated by a mask processing unit 1307 with the captured image 1507 stored in the frame memory 115 at predetermined timing to output a synthesized image.

Figure 16:
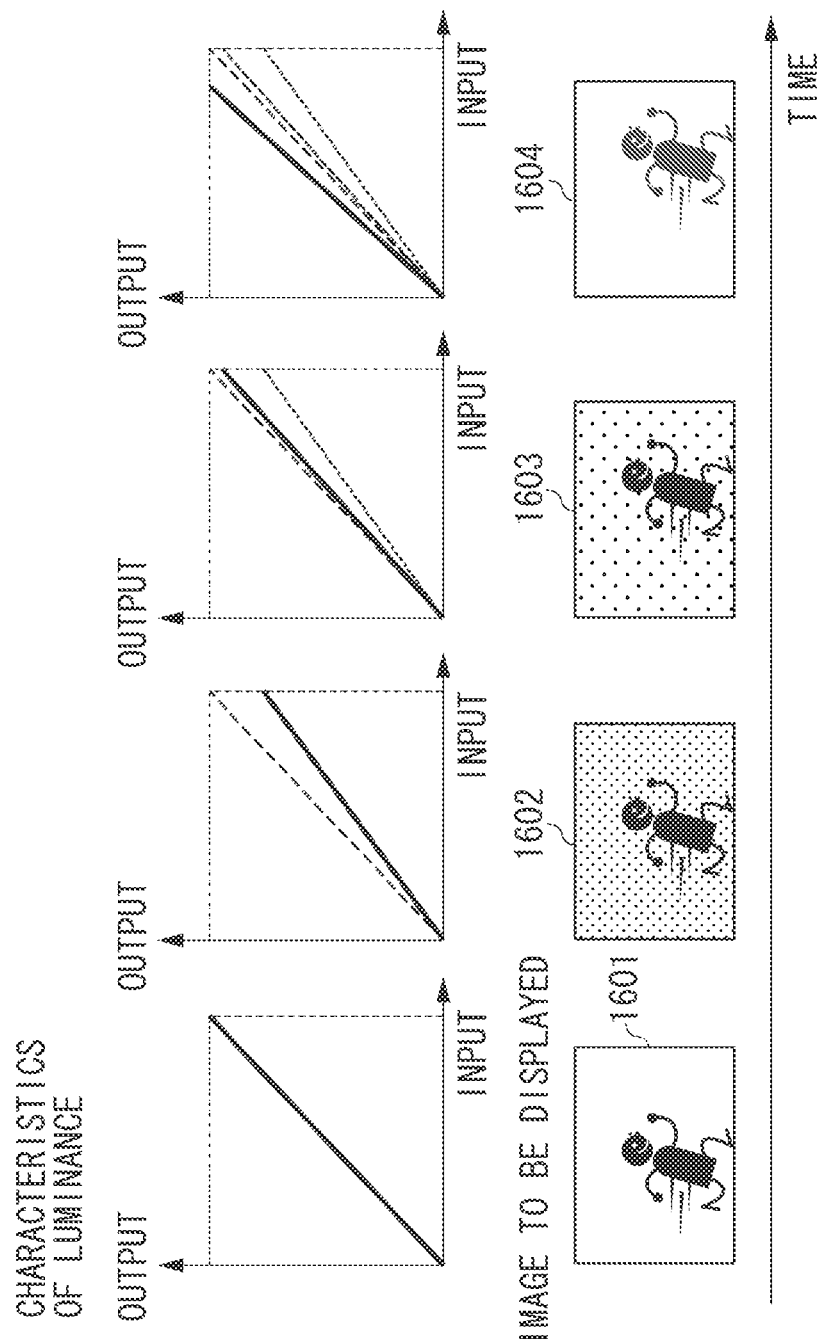
FIGS. 16 illustrates an effect of blinking according to the present invention.

FIG. 16 illustrates correction of a luminance signal for realizing blinking according to the present exemplary embodiment. In the luminance correction processing, blinking of the input captured image is realized by changing a luminance component of an output image based on sequentially changing input/output characteristics. A minimum unit of a change of the luminance signal is minimum resolution of the output image, and minimum time unit is an updating period of the captured image.

When correction is carried out in an order of characteristics 1601 as a reference, and characteristics 1602, 1603, and 1604 as indicated by solid lines, captured images are 1606, 1607, and 1608. In this case, a brightness order is an image 608>an image 1605>an image 1607>an image 1606. To randomly generate blinking, for example, a plurality of parameter data constituting input/output characteristics may be prepared, and the parameter data to be used may be determined based on a random number. Various random numbers such as that of Gaussian distribution can be employed, however, they are not limited to any specific types of random numbers.

The memory 135 illustrated in FIG. 1 stores a plurality of luminance characteristic data for determining input/output characteristics of the luminance of the video signal. For example, in the case where characteristics 1601 to 1604 are represented by a linear function, parameter data includes inclination and intercept of a straight line. A point of clipping an output or a clipped value when an input is large, is also parameter data, as in the case of the characteristics 1604. The determined parameter data is transmitted to a luminance correction processing unit 127.

The luminance correction processing unit 127 corrects the input/output characteristics of the luminance for the captured image read from the frame memory 115 according to the parameter data indicating the determined correction characteristics, and outputs the corrected captured image to the frame memory 115.

The system controller 114 designates a clipping position and a clipping size from the grain noise memory 118, to the grain clipping processing unit 119, and designates a resizing amount to the grain resizing processing unit 120. The system controller 114 designates a synthesis ratio of image data to be read and grain noise data 1203, to the grain synthesis processing unit 121.

Similarly, the system controller 114 designates a clipping position and a clipping size from the scratch noise memory 121, to the scratch clipping processing unit 122 that synthesizes the scratch noise, and designates a resizing amount of the clipped scratch noise to the scratch resizing processing unit 124. The system controller 114 designates a synthesizing position of the scratch noise and synthesis ratio with the captured image data to the scratch synthesis processing unit 125.

Next, an operation including a user's operation for adding each film-tone image effect according to the present exemplary embodiment will be described.

Figure 17:
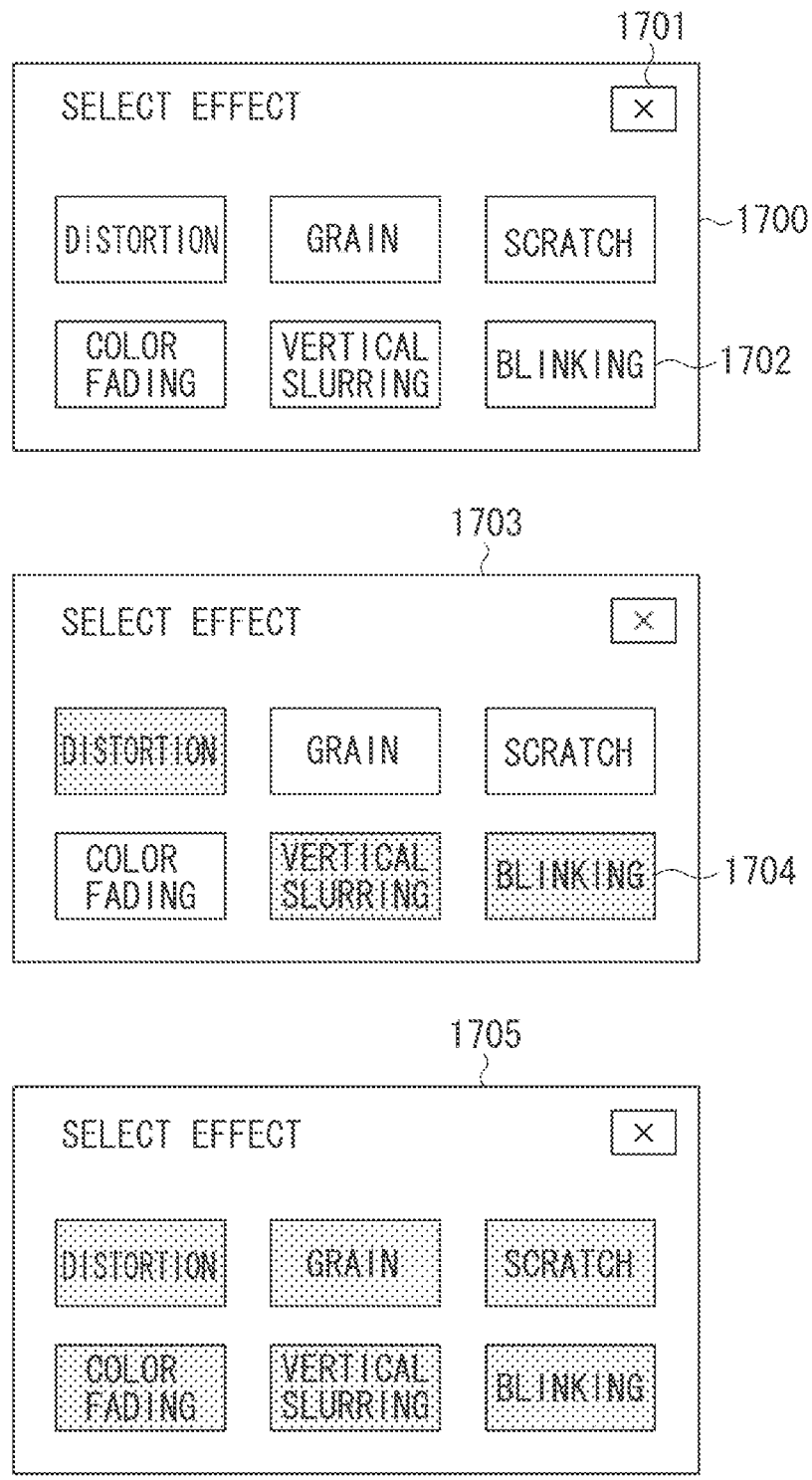
FIG. 17 illustrates an effect selection screen according to the present invention.

The system controller 114 receives an operation of the key switch 103 as an input, and controls selection and determination of a film-tone image effect and controls the UI screen therefor. FIG. 17 illustrates the UI screen for the film-tone image effect to be displayed on the display unit 134. When the key switch 103 is operated to start setting of the film-tone image effect, the processing changes to a screen 1700.

A button 1701 is a button for ending the setting of the film-tone image effect on the UI screen. When the key switch 103 is operated, and the button 1701 is selected to execute the determination, the film-tone image effect setting screen is ended, and an effect selected at this stage is executed. A button 1702 on the UI screen is a button for determining enabling or disabling of a blinking effect and indicating its state. A state of the button 1702 indicates that the blinking effect is disabled.

As for other film-tone image effects, namely, a distortion, grain noise, scratch noise, and vertical slurring, setting and states of the effects can be grasped by a button similar to that of the blinking. The effect setting buttons are controlled by a toggle operation. When the button 1702 is operated in a disabled state of the blinking effect, an enabled state indicated by a button 1704 is set. Conversely, when the button 1704 is operated in an enabled state, a disabled state indicated by the button 1702 is set. Operations are similar for other effect buttons.

A screen 1703 displays a state where a distortion, vertical slurring, and blinking are selected among the film-tone image effects. A screen 1705 displays a state where all the film-tone image effects are selected.

Next, referring to FIGS. 5, 6, and 9, a determination method of an execution order of effects when a plurality of film-tone image effects is selected, will be described in detail. The determination method of the execution order is characteristic processing of the present exemplary embodiment. For example, it is assumed that the system controller 114 has executed the film-tone image effects in order of vertical slurring and scratch noise without taking an execution order of the effects into consideration.

In this case, since phenomena which bring about the effects are vertical slurring of an image being reproduced, caused by film travel during the reproduction, and the noise due to film surface damage caused by a development work mistake, an original phenomenon order in film photographing is scratch noise and vertical slurring. When this order is changed to the vertical slurring and the scratch noise, in an output image, the captured image vertically rises and falls while the scratch noise does not move. As a result, the output image is different from that originally acquired in the film photographing.

Thus, according to the present exemplary embodiment, priority is given beforehand to each effect, and an execution order is determined according to the priority. More specifically, as illustrated in FIG. 6, priority of the film-tone image effects is determined in an order of phenomena which appear during the process starting from film photographing to reproduction. When a value of priority is larger, an effect is executed earlier.

A table of FIG. 6 illustrates information about an image processing method for realizing each effect. An attribute is information indicating correspondence between a phenomenon appearing during the film photographing, and each effect. According to the priority illustrated in FIG. 6, when all the effects are selected, the effects are executed in order of a distortion (first processing), grain noise (second processing), color fading (fifth processing), scratch noise (second processing), vertical slurring (third processing), and blinking (fourth processing). The vertical slurring and the blinking both have reproduction attributes, and are phenomena appearing during the reproduction, and thus priority thereof is high. Priority between the vertical slurring and the blinking is in an order of the vertical slurring and the blinking since projection is carried out from the light source after film is fed, in an actual film reproduction process.

Figure 9:
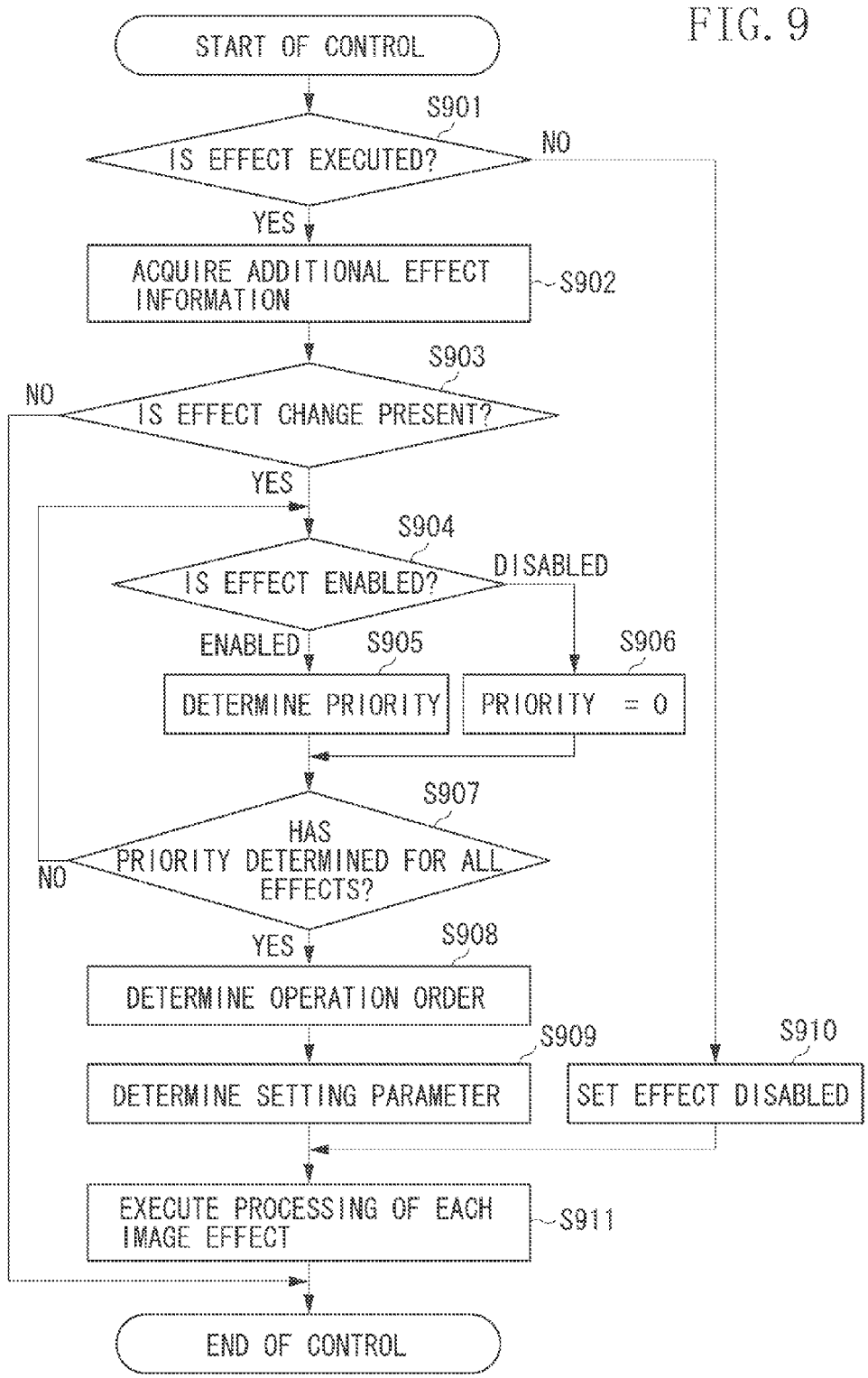
FIG. 9 is a flowchart illustrating processing for determining the order of adding effects according to the first exemplary embodiment.

Next, referring to FIG. 9, the system controller 114 controls each unit to execute the plurality of film-tone image effects. In the present exemplary embodiment, after a user's operation, the image effect processing unit 113 carries out each processing for image data acquired from the image sensor 108 at a predetermined frame rate. However, the present invention is not limited to this. The processing can be applied to moving image data stored in the recording medium 133 or input from the outside, or a plurality of image data continuously captured.

In step S901, it is evaluated whether execution of the film-tone image effects has been determined, from operation information of the key switch 103. When the execution has been determined (YES in step S901), the processing proceeds to step S902. When it is determined that the execution has been cancelled, the processing proceeds to step S907.

In step S902, additional effect information indicating whether any operation of enabling or disabling an effect has been carried out is acquired for all the effects from a selection result on the UI screen. After information has been acquired, the processing proceeds to step S903.

In step S903, the additional effect information acquired in the last control and the currently acquired additional effect information are compared with each other to determine whether they are different. When they are similar (NO in step S903), the control is ended determining that no film-tone image effect operation has been executed. On the other hand, when there is a difference (YES in step S903), it is determined that a certain change has occurred with respect to adding any effect and the processing proceeds to step S904.

In step S904, whether the additional effect information about a designated effect acquired instep S902 is enabled is determined. When enabled (YES in step S904), the processing proceeds to step S905. When disabled (NO in step S904), the processing proceeds to step S906.

In step S905, as for enabled effects, values determined in priority illustrated in the table of FIG. 6 are determined as priority of the designated effects. The higher numerical values, the higher the priority. After the priority has been determined, the processing proceeds to step S907.

In step S906, as for disabled effects, priority of a designated effect is set to zero. Priority of a numeral zero is defined to be lower than any other effects included in the table of FIG. 6. After the priority has been determined, the processing proceeds to step S907.

In step S907, whether priority has been determined for all the effects is evaluated. When the priority has been determined for all the effects (YES in step S907), the processing proceeds to step S908. When not (NO in step S907), the effect determined in step S904 is then established, and the processing proceeds to step S909.

In step S908, an order of applying the effects is determined based on the priority of each effect. Then, the processing proceeds to step S909.

In step S909, a setting parameter is determined for each image effect. At this time, as for the effect having its priority set to zero in step S906, a parameter is set which instructs nonexecution of image processing by inhibiting reading of an image from the frame memory 115, or causing the image to remain unchanged before and after the effect, thereby disabling the effect. After the setting parameter has been determined, the processing proceeds to step S911.

In step S910, a parameter is set which instructs nonexecution of image processing for all the effects or causing the image to remain unchanged before and after the effects, thereby disabling the effects. After the setting parameter has been determined, the processing proceeds to step S911.

In step S911, the system controller 114 sets the setting parameters determined in steps S909 and S910 in each processing unit of the image effect processing unit 113, and causes each unit to process the image effect. The system controller 114 instructs execution of each processing in the order of the effects rearranged by priority in step S908.

The image effect processing unit 113 processes image data sequentially acquired at the respective processing units, and sequentially outputs the image data to the next processing unit. When the processing enabled in the image effect processing unit 113 ends, the processed image data is sequentially output from the image effect processing unit 113. After setting of the parameters and instruction of the execution order has been completed, the control is ended.

In the case where the priority of the effects is set according to the first exemplary embodiment illustrated in FIG. 6, when all the effects are enabled, image processing to be executed and, and an order of execution of the image processing for an input captured image 501 to acquire a final output image 508 are illustrated in FIG. 5. Images 502 to 507 are stored in the frame memory 115. The effects of a distortion, grain noise, scratch noise, color fading, vertical slurring, and blinking have sequentially been applied to the images 502 to 507. As clearly illustrated in FIG. 5, for example, the effects of vertical slurring and blinking are applied after the other image effects are applied.

As described above, according to the first exemplary embodiment, when the plurality of types of film-tone image effects is applied to the captured image, priority is determined beforehand for each effect. In this case, among the film-tone image effects, the execution order of the effects corresponding to the phenomena appearing during the reproduction are applied after the effects corresponding to the other phenomena appearing during the photographing are applied as a priority order. As a result, the phenomena appearing during the reproduction are prevented from occurring before the phenomena appearing during the photographing, and an image capturing result having effects closer to a film tone can be acquired.

Figure 2:
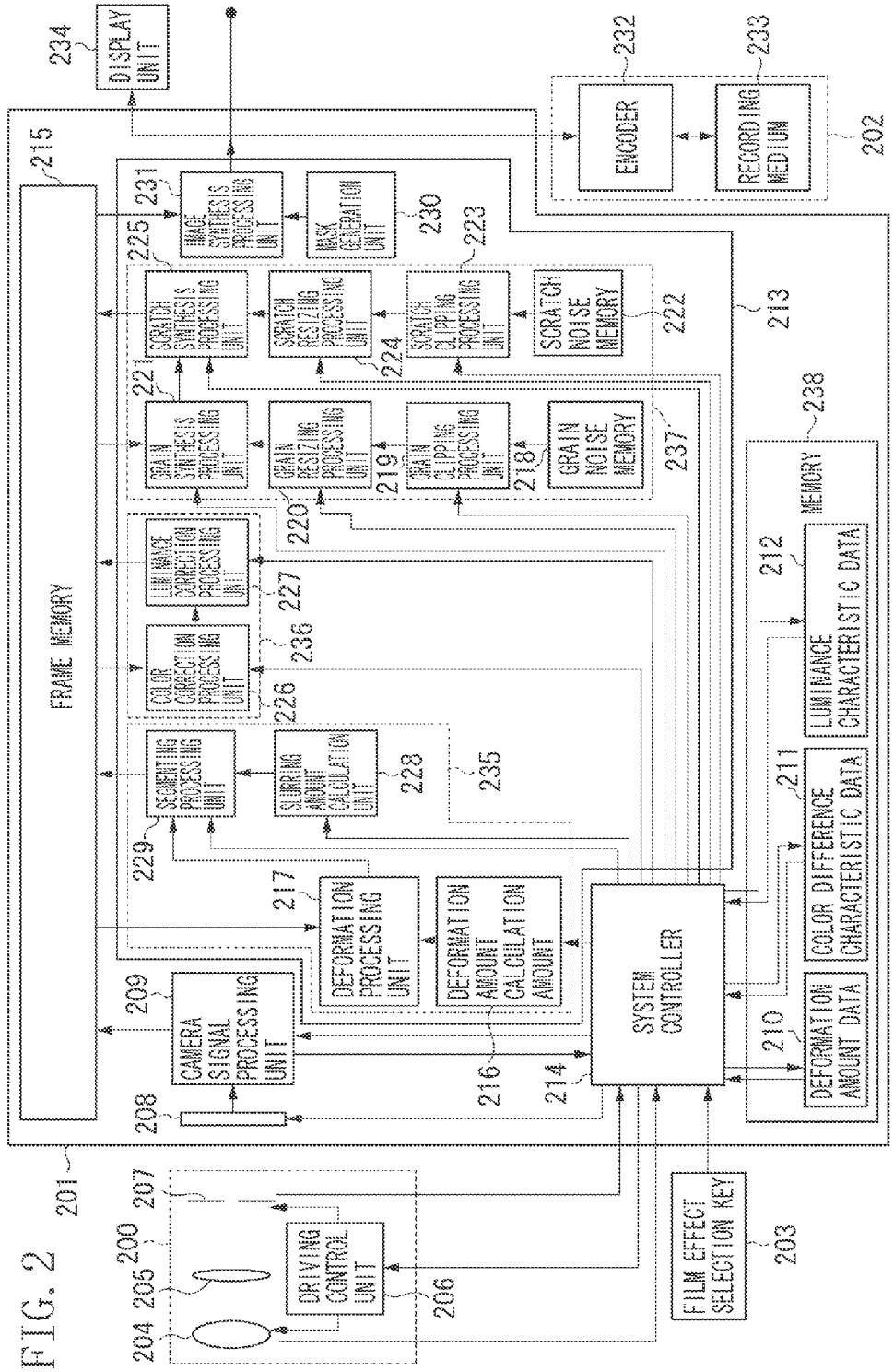
FIG. 2 is a block diagram illustrating an imaging apparatus according to a second exemplary embodiment.

A second exemplary embodiment is directed to an image processing apparatus that can add a plurality of different effects as film-tone image effects to an image. FIG. 2 is a block diagram illustrating a digital video camera as an image processing apparatus according to the second exemplary embodiment. The digital video camera includes: an optical unit 200 that includes a lens, a diaphragm, and an actuator for driving these components; an image capturing unit 201 that processes signals read from an image sensor to sequentially acquire and output image data; a recording unit 202 that records a video signal; and a key switch 203 that includes a group of switches for enabling the user to select and determine film-tone image effects.

A group of lenses 204 and 205 forms an object image. A diaphragm 207 adjusts the amount of incident light. A driving control unit 206 includes an actuator for driving the lens 204 and the diaphragm 207 to have instructed predetermined values. An image sensor 208 photoelectrically converts incident light which passes through the optical unit 200 to form an image. The photoelectrically converted signal is input to a camera signal processing unit 209. The camera signal processing unit 209 performs various image processes on the photoelectrically converted signal to convert it into a video signal.

An image effect processing unit 213 adds various film-tone image effects to the video signal output from the camera signal processing unit 209. The video signal output from the image effect processing unit 213, on which a predetermined user interface screen (hereinafter, UI screen) is superimposed, is displayed on a display unit 234. An encoder 232 codes the video signal output from the image effect processing unit 213 in a predetermined recording format to write and store it in a recording medium 233.

Next, signal processing carried out by the camera signal processing unit 209 will be described. The signal input to the camera signal processing unit 209 is separated into a luminance component and a color component. Various signal processes such as gamma processing, color matrix processing, and contour highlight processing are performed on the each signal component, namely, the separated luminance component and the color component. The processed signal is input as a captured image to a frame memory 215. The frame memory 215 stores the image processed by the camera signal processing unit 209 and the image effect processing unit 113. The image is written or read at predetermined timing.

The image effect processing unit 213 adds a plurality of different film-tone image effects to the input image. The effects to be added are "distortion" for adding a distortion, "grain noise" for adding granular noise, "scratch noise" for adding vertical noise, "color fading" for reducing saturation, "blinking" for adding fluctuation of a luminance level which changes with time, and "vertical slurring" for adding vertical slurring. The image effect processing unit 213 is divided into three types of sub-blocks based on types of image processing for adding film-tone image effects.

A first sub-block is an image processing block for deforming image data read from the fame memory 215. In the first sub-block, distortion and vertical slurring effects are realized. A second sub-block is an image processing block for correcting luminance and color characteristics for the image data read from the fame memory 215. In the second sub-block, color fading and blinking effects are realized. A third sub-block is an image processing block for synthesizing another image data with the image data read from the fame memory 215. In the third sub-block, grain noise and scratch noise effects are realized.

Next, image processing of a plurality of film-tone image effects by the sub-track and an execution order of processes in the sub-block will be described in detail, which is characteristic processing of the present exemplary embodiment. The first sub-block includes two image processing units. Two image processing units add an effect of a distortion for reproducing a phenomenon caused by optical characteristics of the lens in a pseudo manner, in a process starting from film photographing to reproduction during the photographing, and an effect of vertical slurring for reproducing a phenomenon caused by film travel during the reproduction in a pseudo manner.

The first sub-block inputs a captured image stored in the frame memory 215. A deformation amount calculation unit 216 calculates a deformation amount added to the input image. The deformation amount calculation unit 216 determines a moving amount of an intersection point of each region when the image input from the frame memory 215 is divided into predetermined regions. A deformation processing unit 217 carries out geometric deformation processing for the input image according to the deformation amount determined by the deformation amount calculation unit 216.

Further, the deformation amount calculation unit 216 determines various moving amounts based on parameters acquired from deformation amount data 210 containing a plurality of deformation amount data parameters. Thus, an effect of an image where different distortion characteristics are added to the same input image, in other words, an image captured by a lens of optical characteristics of distortion types at a various level or a distortion of a barrel type, and a bobbin type, can be provided.

A vertical slurring clipping processing unit 129 stores, to provide a vertical slurring effect, the input image in a buffer memory (not illustrated). The image is read from the buffer memory at an arbitrary position designated by a slurring amount calculation unit 228, and stored in the frame memory 215.

The second sub-block includes two image processing units that add an effect of color fading for reproducing a phenomenon caused by a secular change of film in a pseudo manner, in the process starting from film photographing to reproduction, and an effect of blinking for reproducing a phenomenon caused by a light source during the reproduction in a pseudo manner.

The second sub-block inputs the captured image stored in the frame memory 215. A color difference characteristic data storage unit stores a plurality of parameter data for determining color difference characteristics of a color difference of a video signal. For example, in the case where characteristics 1401, 1402, and 1403 are represented by a linear function, parameter data includes inclination and intercept of a straight line.

The characteristics 1401 indicate normal characteristics showing no color fading. The characteristics 1402 indicate characteristics of lighter color than the characteristics 1401. The characteristics 1403 indicate characteristics of much lighter colors than the characteristics 1402. Correction characteristic data is determined according to a level of a secular change, for example, the number of storage. The determined parameter data is transmitted to a color difference correction processing unit 226.

The color difference correction processing unit 226 corrects the input/output characteristics of the color difference as for the captured image read from the frame memory 215 according to the parameter data indicating the determined correction characteristics, and outputs the corrected captured image to a luminance correction processing unit 227. The color difference correction processing is carried out after processing of a camera signal processing unit 209. Thus, even when color difference processing changes output characteristics, its result will not affect color component processing executed by the camera signal processing unit 209.

A luminance characteristic data storage unit 212 stores a plurality of parameter data for determining input/output characteristics of luminance of the video signal. For example, in the case where characteristics 1601 to 1604 are represented by a linear function, parameter data includes inclination and intercept of a straight line. A point of clipping an output or a clipped value when an input is large, as in the case of the characteristics 1604, is also parameter data. The determined parameter data is transmitted to a luminance correction processing unit 227.

The luminance correction processing unit 227 corrects the input/output characteristics of the luminance as for the captured image input from the color difference correction processing unit 226 according to the parameter data indicating the determined correction characteristics, and outputs the corrected captured image to the frame memory 215. The luminance correction processing is carried out after processing of the camera signal processing unit 209. Thus, even when luminance correction processing changes output characteristics, its result will not affect luminance component processing executed by the camera signal processing unit 209.

The third sub-block includes two image processing units. Two image processing units add effects of grain noise and scratch noise for reproducing granular noise and linear noise caused by phenomenon processing in the process starting from the film photographing to the reproduction in a pseudo manner.

The second sub-block inputs the captured image stored in the frame memory 215. A grain synthesis processing unit 221 reads the captured image stored in the frame memory 215, and synthesizes the image with grain noise data 1203 at a predetermined synthesis ratio to store it in the frame memory 215.

A scratch noise memory 222 stores scratch noise data 1301 including a plurality of patterns. The scratch noise data 1301 is read from the scratch noise memory 222. A scratch clipping processing unit 223 clips scratch noise data 1302 at a designated position and of a designated size from the scratch noise data 1301. A scratch resizing processing unit 224 resizes the clipped noise data 1302 to scratch noise data 1304 of a size required for synthesis with the captured image 103 stored in the frame memory 215. A scratch synthesis processing unit 225 reads the captured image stored in the frame memory 215, and synthesizes the image with the resized noise data 1304 at a predetermined synthesis ratio to store it in the frame memory 215.

A mask generation unit 230, which is not included in any of the first to third sub-blocks, generates a mask image having a maximum slurring width or more when a vertical slurring effect is selected. A mask synthesis processing unit 231 synthesizes, after the image processing has been completed in the first to third sub-blocks, a mask image 1308 generated by a mask processing unit 1307 with the captured image 1507 stored in the frame memory 115 at predetermined timing to output a synthesized image.

A system controller 214 controls the image sensor 208, the camera signal processing unit 209, and the image effect processing unit 213. The system controller 114 designates a signal storage period or reading timing to the image sensor 208. The system controller 114 sets, for the camera image processing unit 209, parameters required for image quality setting in various signal processes. The system controller 114 acquires evaluation values required for exposure control, focus control, and white balance control from the camera image processing unit 209.

The system controller 214 detects control positions of the lens 204 and the diaphragm 207, determines, based on the evaluation values acquired from the camera image processing unit 209, control values so that the control positions can be placed at desired positions, and then designates the control values to the actuator 206.

The system controller 214 instructs each effect processing portion of a film effect control unit 239 to determine an execution order of effects, and execute various setting and operations. The system controller 214 designates a type and a level of a distortion to be added for the deformation amount data 210 to acquire a deformation amount parameter. The system controller 214 sets a deformation amount to be set for the deformation amount calculation unit 216.

The system controller 214 designates a size and a clipping position from the grain noise memory 218, to the grain clipping processing unit 219, and designates a resizing amount to the grain resizing processing unit 220. The system controller 214 designates a synthesis ratio of a captured image and grain noise data 1203 to the grain synthesis processing unit 221. Similarly, the system controller 214 designates a size and a clipping position from the scratch noise memory 221, a resizing amount of the clipped scratch noise, and a synthesizing position of the scratch noise and a synthesis ratio with the captured image data, to the scratch clipping processing unit 222 that synthesizes the scratch noise, the scratch resizing processing unit 224, and the scratch synthesis processing unit 225.

The system controller 214 designates a degree of a secular change for color difference characteristic data 211 stored in a memory 238 illustrated in FIG. 2, and acquires color difference correction data according to the degree. Then, the system controller 214 sets the acquired data in the color difference correction processing unit 226.

The system controller 214 instructs the slurring amount calculation unit 228 to calculate a slurring amount, and designates a vertical slurring clipping processing unit 229 to execute a clipping operation. The system controller 214 instructs the mask processing unit 237 to generate a mask image.

The system controller 214 receives an operation of the key switch 203 as an input, and controls the display unit 214 to select and determine a film-tone image effect and the UI screen therefor. FIG. 17 illustrates the UI screen for the film-tone image effect displayed on the display unit 234. When the key switch 203 is operated to start setting of the film-tone image effect, the processing changes to a screen 1700. A button 1701 is configured to end the setting of the film-tone image effect on the UI screen. When the key switch 203 is operated, and the button 1701 is selected to execute determination, the film-tone image effect setting screen is ended, and an effect selected at this stage is executed.

A button 1702 on the UI screen, is configured to determine enabling or disabling of a blinking effect and indicate the determined state. A state of the button 1702 shown in the drawing indicates that the blinking effect is disabled. Other film-tone image effects, namely, a distortion, grain noise, scratch noise, and vertical slurring can be set and grasped by buttons similar to that of the blinking.

The effect setting button is configured to carry out a toggle operation. If the button 1702 is operated when the blinking effect is in the disabled state, an enabled state indicated by a button 1704 is set. Conversely, when the button 1704 is operated in the enabled state, an disabled state of the button 1702 is set. Similar operations are performed on other effect buttons. A screen 1703 displays a state where a distortion, vertical slurring, and blinking are selected among the film-tone image effects. A screen 1705 displays a state where all the film-tone image effects are selected.

Next, referring to FIGS. 7, 8A to 8D, and 10, a determination method of an execution order of effects among the sub-blocks when a plurality of film-tone image effects is selected will be described in detail. In the present exemplary embodiment, the film-tone image effects are executed by sub-block units. For example, when all the effects are selected to be executed, image processing is carried out in all of the first to third sub-blocks.

When the execution order of the effects among the sub-blocks is the first sub-block, the second sub-block, and the third sub-block, effects of grain noise and scratch noise executed in the third block are last processes to be performed. Vertical slurring or blinking is an effect appearing at a downstream reproduction stage among the process starting from film photographing to the reproduction. Accordingly, vertical slurring or blinking is added before granular noise or vertical noise appearing at an upstream stage. In this case, a captures image which vertically rises and falls while the scratch noise does not, is output, and a result is different from an effect originally acquired in the film photographing.

Thus, according to the present exemplary embodiment, priority is defined beforehand for each effect, evaluation values are determined for each sub-block according to priority, and an execution order is determined according to the order of the evaluation values. FIGS. 8A to 8D are tables each illustrating a relationship in priority and evaluation value among various film-tone image effects. FIG. 8A illustrates evaluation values of the respective sub-blocks when all the effects are executed. Means described in the table of FIG. 8A indicates information about an image processing method for executing each effect.

An attribute is information indicating correspondence between a phenomenon appearing during the film photographing and a process stage of the phenomenon to which each effect corresponds to. A value of priority becomes larger toward the upstream stage of the process. The higher execution priority, the larger evaluation values. Thus, in an example illustrated in FIG. 8A, the effects are executed in the order of the first to third sub-blocks.

Figure 10B:
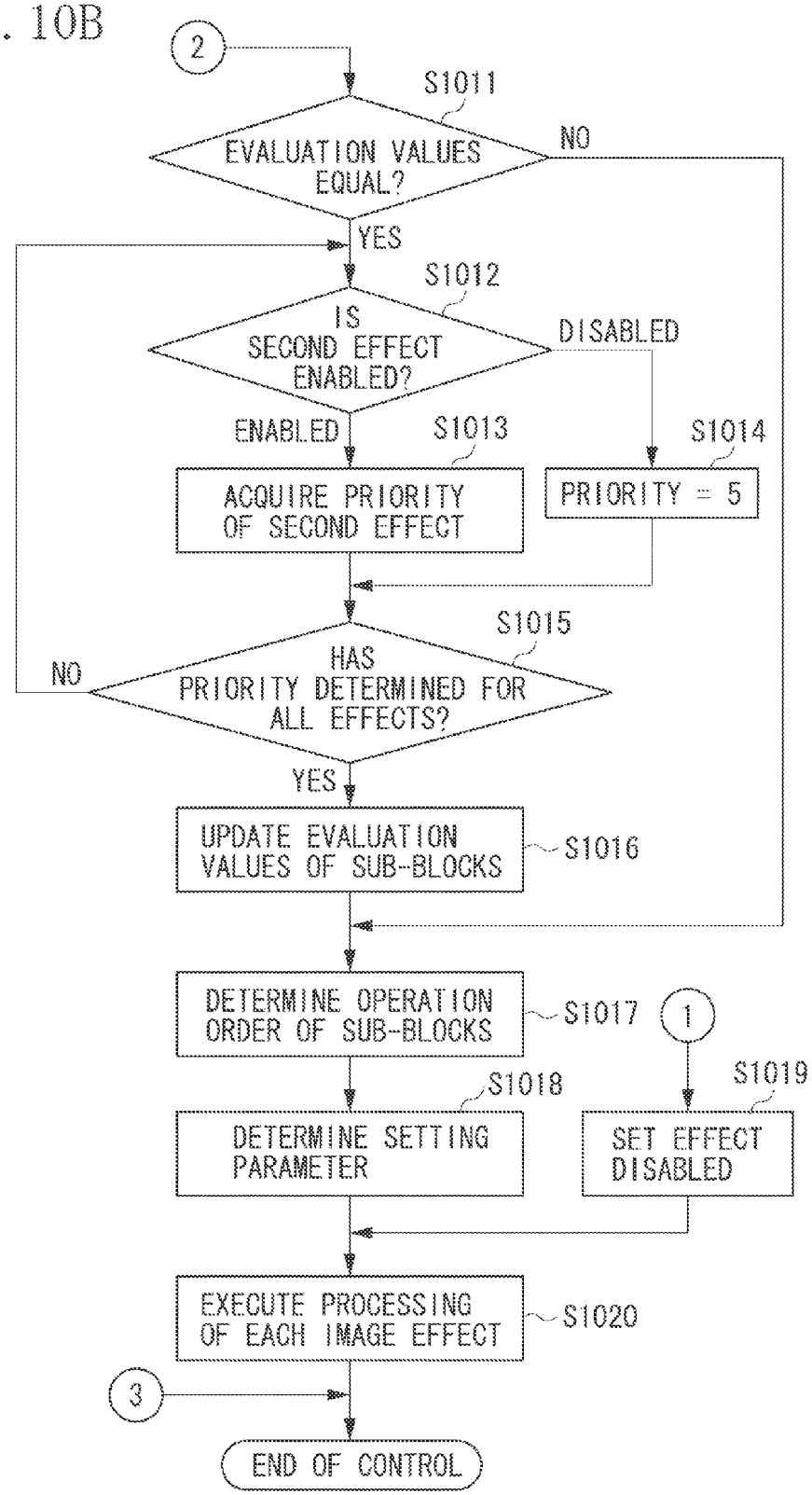

Next, referring to FIG. 10, control where the system controller 214 causes each unit to execute the plurality of film-tone image effects will be described. In the present exemplary embodiment, after a user's operation, the image effect processing unit 213 carries out each processing for image data acquired at a predetermined frame rate from the image sensor 208. The present invention is not limited to this, however, this processing can be applied to moving image data stored in a recording medium 233 or input from the outside, or a plurality of image data continuously captured in time. In step S1001, whether execution of the film-tone image effects have been determined, is checked from operation information of the key switch 203. When the execution is determined (YES in step S1101), the processing proceeds to step S1002. When it is determined that the execution has been cancelled, the processing proceeds to step S1018.

In step S1002, additional effect information indicating whether any operation of enabling or disabling an effect has been carried out is acquired with respect to all the effects from a selection result on the UI screen. After information has been acquired, the processing proceeds to step S1003.

In step S1003, the additional effect information acquired in the last control and the currently acquired additional effect information are compared with each other to determine whether they are similar or different. When similar (NO in step S1003), the control is ended determining that no film-tone image effect operation has been executed. On the other hand, when there is a difference (YES instep S1003), the processing proceeds to step S1004 determining that a certain change has occurred in effect addition.

In step S1004, whether the additional effect information for a designated effect acquired in step S1002 is enabled or disabled, is determined. When enabled (YES in step S1004), the processing proceeds to step S1005. When disabled (NO in step S1004), the processing proceeds to step S1006.

In step S1005, as for enabled effects, priority values determined in the table of FIG. 8A are determined as priority of the designated effects. After the priority has been determined, the processing proceeds to step S1007.

In step S1006, as for disabled effects, priority of a designated effect is set to zero. The numeral zero defines priority of an effect to be lower than any other effects. After the priority has been determined, the processing proceeds to step S1007.

In step S1007, whether priority has been determined for all the effects is checked. When the priority has been determined (YES in step S1007), the processing proceeds to step S1008. When not (NO in step S1007), the effect to be checked in next step S1004 is determined, and the processing proceeds to step S1004.

In step S1008, priority of the effects in each sub-block is compared with one another, and priority of an effect having high priority, in other words, first in execution order, is acquired. In a configuration illustrated in FIG. 8A, priority of a distortion effect is acquired in the first sub-block, priority of a color fading effect is acquired in the second sub-block, and priority of a grain noise effect is acquired in the third sub-block. After each priority has been acquired, the processing proceeds to step S1009.

In step S1009, values of the priority for the sub-blocks acquired in step S1008 are rearranged in descending order. In the configuration illustrated in FIG. 8A, a rearranged priority order is 4, 3, and 2. After the rearrangement, the processing proceeds to step S1010.

In step S1010, evaluation values of corresponding sub-blocks are determined according to the priority rearranged in step S1009. Evaluation values are 2, 1, and zero in descending order. In the example illustrated in FIG. 8A, evaluation values are 2 in the first sub-block, 1 in the second sub-block, and zero in the third sub-block. When priority is equal, and higher than the remaining effects, evaluation values are 2. Conversely, when priority is lower, evaluation values are zero. After the evaluation values have been determined for the sub-blocks, the processing proceeds to step S1011.

In step S1011, whether the evaluation values determined in step S1010 are all different among the sub-blocks. In the example illustrated in FIG. 8A, the evaluation values of the sub-blocks are all different from one another. Each of FIGS. 8B to 8C illustrates an example of a configuration of sub-blocks where among a plurality of effects constituting the sub-blocks, evaluation values of first effects are equal. In FIGS. 8B and 8C, priority is equal between the first and second blocks. In FIG. 8D, priority is equal among all the sub-blocks. When the evaluation values are all different, the processing proceeds to step S1017. As illustrated in FIGS. 8B to 8D, when the evaluation values are equal between any given sub-blocks, the processing proceeds to step S1012.

In step S1012, it is determined whether among the effects included in the sub-block, an effect second in priority is enabled or disabled based on the additional effect information acquired in step S1002. In the example illustrated in FIG. 8B, the effects second in priority in the sub-blocks are all enabled. In the examples illustrated in FIGS. 8C and 8D, the effects second in priority in the first and third sub-blocks are enabled, while the effect second in priority in the second sub-block is disabled. When it is determined that the effect is enabled (YES in step S1012), the processing proceeds to step S1013. When it is determined that the effect is disabled (NO in step S1012), the processing proceeds to step S1014.

In step S1013, priority of the second effect is acquired. In the example illustrated in FIG. 8B, priority of the first to third sub-blocks are respectively 1, 2, and 1. After the priority has been determined, the processing proceeds to step S1015.

In step S1014, priority of a sub-block having no second effect is determined to be 5. This priority is larger in value than that of any other effects. In the example illustrated in FIG. 8C, priority of the sub-blocks is respectively 1, 5, and 1. Similarly, in the example illustrated in FIG. 8D, priority of the sub-blocks is respectively 1, 5, and 2. After the priority has been determined, the processing proceeds to step S1015.

In step S1015, whether priority has been determined for all the effects is determined. When priority has been determined (YES in step S1015), the processing proceeds to step S1016. When priority has not been determined (NO in step S1015), the processing proceeds to step S1012.

In step S1016, temporary evaluation values of the respective sub-blocks are determined according to the priority determined in steps S1013 and S1014. The temporary evaluation values are 2, 1, and zero in descending order. When priority is equal, and higher than other effects, temporary evaluation values are 2. Conversely, when priority is lower, temporary evaluation values are zero. In the example illustrated in FIG. 8B, temporary evaluation values are respectively zero, 2, and zero in the first to third sub-blocks. The acquired temporary evaluation values are added to the evaluation values determined based on the priority of the first effects in step S1010 to be final evaluation values. In the example illustrated in FIG. 8B, final evaluation values are respectively 2, 4, and zero in the first to third sub-bocks. After the final evaluation values have been determined with respect to the sub-blocks, the processing proceeds to step S1017.

In step S1017, the determined evaluation values of the respective sub-blocks are rearranged in descending order. Image processing of the respective sub-blocks are executed in the rearranged order, and film-tone image effects are added. After the rearrangement, the processing proceeds to step S1018.

In step S1018, a setting parameter is determined for each image effect. At this time, for the effect having its priority set to zero in step S106 or the effect having its priority set to 5 in step S1014, namely, as for an disabled effect, a parameter is set inhibiting reading of an image from the frame memory 215 Alternatively, a parameter is set which makes characteristics of the image similar before and after effect is added to the read image, thereby disabling the effect. After the setting parameter has been determined, the processing proceeds to step S1020.

In step S1019, a parameter is set instructing not to execute image processing for all the effects or a parameter is determined which makes similar the characteristics of the read image before and after effect is added to the read image, thereby disabling the effects. After the setting parameter has been determined, the processing proceeds to step S1020.

In step S1020, the system controller 214 sets the setting parameters determined in steps S1018 and S1019 in each processing portion of the image effect processing unit 213. The system controller 114 instructs the respective sub-blocks to execute the image processing in the order of the effects rearranged in step S1017. After the instruction as to setting of the parameters and the execution order has been completed, the control is ended.

FIG. 7 illustrates, according to the second exemplary embodiment in the case of the priority of the effects illustrated in FIG. 8A, if all the effects are enabled, what image processing is executed in what order for an input captured image 701 to acquire a final output image 708. Images 702 to 707 stored in the frame memory 215 are images to which the effects of a distortion, grain noise, scratch noise, color fading, vertical slurring, and blinking have sequentially been applied. As illustrated, concerning the effects in the sub-blocks, the effect of vertical slurring is carried out as a last effect of the first sub-block, and the effect of blinking is carried out as a last effect of the third sub-block.

As described above, according to the second exemplary embodiment, when the plurality of types of film-tone image effects is applied to the captured image, the sub-block assembling a plurality of effects is configured. In this case, among the plurality of effects in the sub-block, the execution of the film-tone image effects corresponding to the phenomena appearing during the reproduction such as vertical slurring and blinking are performed after the other effects are performed, in priority order. As a result, the phenomena appearing in the same sub-block during the reproduction is not applied before the phenomena appearing during the photographing at the upstream stage, and a result having effects closer to a film photographing can be acquired.

Further, according to the present exemplary embodiment, reading/writing of the image data between the frame memory 215 and the image effect processing unit 213 is carried out by sub-block unit. Accordingly, when the number of effects to be added increases, as compared with a case of executing reading/writing from and to the frame memory 215, the number of memory accessing times per unit time is reduced. This can increase a memory latitude of the frame memory 215. The reduced number of reading/writing times reduces a delay of time from an input of the captured image into the image effect processing unit 213 to an output of the captured image. Thus, an image can be acquired with less delay time while adding the film-tone image effects.

In the example of the priority according to the present exemplary embodiment illustrated in FIG. 8B, the first and second sub-blocks are equal in priority order as for the first effects. As a result, it is not appropriately determined which to execute first. However, by taking into account the priority of the second effect in each sub-block, an execution order can be determined to be the second sub-block and then the first sub-block. Accordingly, the second sub-block including many upstream stages is executed first, and the first sub-block including downstream stages is then executed. Thus, according to the present exemplary embodiment, by determining the execution order of the sub-blocks according to the types of the effects constituting the sub-blocks, a result having effects closer to a film photographing can be acquired.

In the examples of the priority according to the present exemplary embodiment illustrated in FIGS. 8C and 8D, only one of the effects included in the second sub-block is enabled. In such a case, an enabled effect of the second sub-block is set as a first effect irrespective of order in the sub-block and as a priority, an execution order is placed before the other sub-blocks having pluralities of effects, so that the second sub-block is executed first. Thus, according to the present exemplary embodiment, even when the user selectively determines effects on the UI screen, the execution order of the effects are appropriately determined, and a result having effects closer to a film photographing can be acquired.

The first and second exemplary embodiments have been directed to the case of adding the plurality of film-tone image effects during the moving image capturing operation of the digital video camera. However, the present invention is not limited to the moving image capturing. The invention can be applied to a case of adding effects of film photographing in continuous capturing of a plurality of images or reproduction of a moving image.

The exemplary embodiments of the present invention have been described in detail. However, the present invention is not limited to the exemplary embodiments. Various changes can be made without departing from the gist of the invention. Some portions of the exemplary embodiments can appropriately be combined.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-006311 filed Jan. 16, 2012, which is hereby incorporated by reference herein in its entirety.

What is claimed is:

1. An image processing apparatus comprising:
   an acquisition unit configured to sequentially acquire image data;
   a first processing unit configured to carry out image distortion processing on the image data;
   a second processing unit configured to add noise to the image data processed by the first processing unit; and
   a third processing unit configured to add slurring to the image data processed by the second processing unit and sequentially output,
   wherein the second processing unit comprises:
      a first generating unit configured to generate first noise data corresponding to an entire frame of the image data from noise data stored in a memory; and
      a combining unit configured to combine the first noise data with the image data processed by the first processing unit,
      a second generating unit configured to generate second noise data corresponding to a portion of the image data from noise data stored in a memory,
      wherein the combining unit combines the second noise data with the image data combined with the first noise data by the combining unit.

2. The image processing apparatus according to claim 1, further comprising a fourth processing unit configured to add luminance correction of luminance characteristics randomly determined in terms of time, to the image data output by the third processing unit.

3. The image processing apparatus according to claim 2, further comprising a fifth processing unit configured to correct a color of the image data output from the second processing unit, and output the processed image data to the third processing unit.

4. The image processing apparatus according to claim 1, wherein the first processing unit carries out projective transformation processing for the image data based on a parameter stored in a memory.

5. The image processing apparatus according to claim 1, wherein the first processing unit divides the image data into a predetermined number of regions and moves each intersection point of the divided region to predetermined coordinates as the image distortion processing.

6. The image processing apparatus according to claim 1, wherein the third processing unit clips each image of a plurality of sequentially-acquired image data from the second processing unit at a position determined based on a random value.

7. A method for controlling an image processing apparatus, comprising:
   a memory;
   a processor coupled to the memory which executes the following:
   sequentially acquiring image data;
   executing first processing to distort an image periphery of the image data;
   executing second processing to add noise to the image data processed by the first processing;
   executing third processing to add slurring to the image data processed by the second processing and sequentially output;
   generating first noise data corresponding to an entire frame of the image data from noise data stored in the memory; and
   combining the first noise data with the image data processed by the first processing, generating second noise data corresponding to a portion of the image data from noise data stored in the memory,
wherein the second noise data is combined with the image data combined with the first noise data.

8. A non-transitory storage medium storing a computer readable program for causing a computer to execute each process of the control method of the image processing apparatus according to claim 7.

9. The method according to claim 7, further comprising executing fourth processing to add luminance correction of luminance characteristics randomly determined in terms of time, to the image data output by the third processing.

10. The method according to claim 9, further comprising executing fifth processing to correct a color of the image data output from the second processing, and output the processed image data to the third processing.

11. The method according to claim 7, wherein the first processing carries out projective transformation processing for the image data based on a parameter stored in a memory.

12. The method according to claim 7, wherein the first processing divides the image data into a predetermined number of regions and moves each intersection point of the divided region to predetermined coordinates as the image distortion processing.

13. The method according to claim 7, wherein the third processing clips each image of a plurality of sequentially-acquired image data from the second processing at a position determined based on a random value.

* * * * *